(12) United States Patent
Kamiyama et al.

(10) Patent No.: US 8,578,328 B2
(45) Date of Patent: Nov. 5, 2013

(54) METHOD FOR PRESENTING CANDIDATE FOR LINK TARGET TO COMPONENT IN WEB APPLICATION, AS WELL AS COMPUTER PROGRAM AND COMPUTER SYSTEM FOR THE SAME

(75) Inventors: Yoshiroh Kamiyama, Kanagawa (JP); Gou Nakashima, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 12/634,304

(22) Filed: Dec. 9, 2009

(65) Prior Publication Data

US 2010/0192140 A1 Jul. 29, 2010

(30) Foreign Application Priority Data

Jan. 27, 2009 (JP) .................................... 200915625

(51) Int. Cl.
*G06F 9/44* (2006.01)
(52) U.S. Cl.
USPC ........... 717/106; 717/107; 717/109; 717/110; 717/113

(58) Field of Classification Search
USPC .......................... 717/106, 107, 109, 110, 113
See application file for complete search history.

(56) References Cited

U.S. PATENT DOCUMENTS

| 5,546,557 A | 8/1996 | Allen et al. |
| 2006/0095835 A1* | 5/2006 | Kennedy et al. ................. 707/1 |

OTHER PUBLICATIONS

"What is iGoogle?"; www.google.com/support/websearch/bin/answer.py?hl=en&answer-20324; last visited on Dec. 8, 2009.

* cited by examiner

*Primary Examiner* — Qamrun Nahar
(74) *Attorney, Agent, or Firm* — Steven M. Greenberg, Esq.; Carey, Rodriguez, Greenberg & O'Keefe

(57) ABSTRACT

Embodiments of the present invention provide a method, a computer system and its computer program which are for presenting a candidate to be linked with a component when the component is to be linked to another component in a web application. In one embodiment, the method includes the steps of: displaying at least two components on a display device; allowing a user to select at least one tag from tags (first tags) on one component (a first component) of the at least two components; identifying a second component having the same tag as the selected first tag; and presenting the identified second component to the user.

20 Claims, 21 Drawing Sheets

METHOD FOR PRESENTING CANDIDATE FOR LINK TARGET TO COMPONENT IN WEB APPLICATION, AS WELL AS COMPUTER PROGRAM AND COMPUTER SYSTEM FOR THE SAME

CROSS-REFERENCE TO RELATED APPLICATIONS

This application claims priority under 35 U.S.C. §119(a) to Japanese Patent Application Serial Number 200915625, filed on Jan. 27, 2009, entitled "Method for Presenting Candidate for Link Target to Component in Web Application, as well as Computer Program and Computer System for the Same", the entirety of which is incorporated herein by reference.

BACKGROUND OF THE INVENTION

1. Field of the Invention

The present invention relates to a method for presenting a candidate component to be linked with a component in a web application, and to a computer program and a computer system for the same.

2. Description of the Related Art

Multiple components are used to generate a Web 2.0 application. In order to generate a situation-dependent application, business users who are non-IT specialists have to be able to arrange and link components in the application. Yet, it is difficult to know whether two components are linkable to each other. In fact, component linkage is not easy for users, especially users who are not IT specialists.

iGoogle™ is a web service provided by Google (registered trademark). iGoogle allows users to freely add components, such as the latest news and weather, to the Google top page. Users can add various components to their own Google top pages by selecting a component from a list or by editing component settings. In iGoogle, however, it is presumed that all components in the list are linkable to each other.

SUMMARY OF THE INVENTION

Whether components in a web application are linkable to each other cannot be known by simply looking at the components. Accordingly, the present invention provides a method that allows users to know quickly and easily whether two components in a web application are linkable to each other.

The present invention provides a method for presenting a candidate to be linked with a component when the component is to be linked to another component in a web application. The method includes the steps of: displaying at least two components on a display device, the components each having a property assigned a tag used to link up components; allowing a user to select at least one tag from tags on one component of the at least two components (the one component being called a first component, the tags on the first component being called first tags, below), the first tags collected on the first component as tags assigned to properties of one or more components other than the first component (the one or more components being called second components, the tags of the second components being called second tags, below); identifying a second component having the same tag as the selected first tag; and presenting the identified second component.

In one embodiment of the present invention, the allowing step further includes the steps of: allowing a user to select one component (the first component) of the at least two components; collecting the second tags of the second components other than the selected component (the first component); and displaying the collected second tags on the selected component (the first component), as the first tags.

In one embodiment of the present invention, the allowing step further includes a step of displaying a property, an event, or both for each component, in response to a start of a component-link edit mode.

In one embodiment of the present invention, the allowing step further includes a step of displaying the first tags in response to a request by the user to display the first tags.

In one embodiment of the present invention, the request to display the first tags is an event selection made by the user.

In one embodiment of the present invention, the allowing step further includes a step of displaying a list of the first tags in a list box, on the display device.

In one embodiment of the present invention, each of the tags is any of a type name, a property name, a constraint, an annotation, and a template.

In one embodiment of the present invention, the identifying step further includes a step of identifying a property, of the second component, having the same tag as the selected first tag.

In one embodiment of the present invention, the presenting step further includes a step of presenting the user a property of the second component identified as being assigned the second tag that is the same as the first tag.

In one embodiment of the present invention, the method further causes the computer system to execute the following steps. The steps include a step of calculating a similarity by checking the selected first tag against one or more second tags assigned to each of the properties of the second components.

In one embodiment of the present invention, the method further causes the computer system to execute the following steps. The steps include a step of displaying any one of the calculated similarity and an indication based on the similarity, on each of the properties assigned the second tags.

In one embodiment of the present invention, the method further causes the computer system to execute the following steps. The steps include a step of displaying, on the display device, a link line between an output of the first component and an input of each of the second components linkable with the first component.

In one embodiment of the present invention, the method further causes the computer system to execute the following steps. The steps include the steps of: displaying a link icon (a first link icon) for the first component on or near the first component; and displaying a link icon (a second link icon) for each of the second components on or near the second component when the second component has one or more second tags matching any one, some or all of the selected first tags.

In one embodiment of the present invention, the method further causes the computer system to execute the following steps. In the steps, the step of displaying the second link icon on or near the second component further includes a step of displaying the second link icon on or near a display of a property assigned a second tag matching the selected first tag.

In one embodiment of the present invention, the method further causes the computer system to execute the following steps. The steps include a step of displaying a link line between the first link icon and a certain one of the second link icons linked with the first link icon, in response to an event in which the first link icon is linked to the certain second link icon.

In one embodiment of the present invention, the method further causes the computer system to execute the following steps. The steps include a step of changing input information of each of the second components linked to an output of the first component, in accordance with an operation made on the first component.

In one embodiment of the present invention, the method further causes the computer system to execute the following steps. The steps include a step of changing output information of the first component linked to an input of a certain one of the second components, in accordance with an operation made on the certain second component.

In one embodiment of the present invention, each of the components is a mashup component.

The present invention also provides a computer system for presenting a candidate to be linked with a component when the component is to be linked to another component in a web application. The system includes: a display unit that displays at least two components, the components each having a property assigned a tag used to link up components; an allowing unit that allows a user to select at least one tag from tags on one component of the at least two components (the one component being called a first component, the tags on the first component being called first tags, below), the first tags collected on the first component as tags assigned to properties of one or more components other than the first component (the one or more components being called second components, the tags of the second components being called second tags, below); an identification unit that identifies a second component having the same tag as the selected first tag; and a presenting unit that presents the identified second component.

In one embodiment of the present invention, the allowing unit further: allows a user to select one component (the first component) of the at least two components; collects the second tags of the second components other than the selected component (the first component); and displays the collected second tags on the selected component (the first component), as the first tags.

In one embodiment of the present invention, the allowing unit further: displays a property, an event, or both for each component, in response to a start of a component-link edit mode.

In one embodiment of the present invention, the allowing unit further displays the first tags in response to a request by the user to display the first tags.

In one embodiment of the present invention, the allowing unit further displays a list of the first tags in a list box, on the display device.

In one embodiment of the present invention, the identifying unit further identifies a property, of the second component, having the same tag as the selected first tag.

In one embodiment of the present invention, the presenting unit further presents the user a property of the second component identified as being assigned the second tag that is the same as the first tag.

In one embodiment of the present invention, the computer system further includes a calculator that calculates a similarity by checking the selected first tag against one or more second tags assigned to each of the properties of the second components.

In one embodiment of the present invention, the display unit further displays any one of the calculated similarity and an indication based on the similarity, on each of the properties assigned the second tags.

In one embodiment of the present invention, the displaying unit further displays, on the display device, a link line between an output of the first component and an input, of each of the second components, linkable with the first component.

In one embodiment of the present invention, the displaying unit further displays: a link icon (a first link icon) for the first component on or near the first component; and a link icon (a second link icon) for each of the second components on or near the second component when the second component has one or more second tags matching any one, some or all of the selected first tags.

In one embodiment of the present invention, when the second link icon is displayed on or near the second component, the displaying unit further displays the second link icon on or near a display of a property assigned a second tag matching the selected first tag.

In one embodiment of the present invention, the displaying unit further displays a link line between the first link icon and a certain one of the second link icons linked with the first link icon, in response to an event in which the first link icon is linked to the certain second link icon.

In one embodiment of the present invention, the computer system further includes a changer that changes input information of each of the second components linked to an output of the first component, in accordance with an operation made on the first component.

In one embodiment of the present invention, the changer further changes output information of the first component linked to an input of a certain one of the second components, in accordance with an operation made on the certain second component.

The present invention also provides a method for presenting a candidate to be linked with a component when the component is to be linked to another component in a web application. The method includes the steps of: displaying at least two components on a display device, the components each having any of attribute information and a topic name which are associated with the component; determining if any of at least one piece of the attribute information and the topic name associated with one component (called a first component below) of the components matches part or all of any of the attribute information and the topic name associated with each of the other components (called second components below) of the components; and presenting the matching second component.

The present invention also provides a computer system for presenting a candidate to be linked with a component when the component is to be linked to another component in a web application. The system includes: a display unit that displays at least two components, the components each having any of attribute information and a topic name which are associated with the component; a determination unit that determines if any of at least one piece of the attribute information and the topic name associated with one component (called a first component below) of the components matches part or all of any of the attribute information and the topic name associated with each of the other components (called second components below) of the components; and a presenting unit that presents the matching second component.

The present invention further provides a computer program that causes a computer system to execute the steps described in any one of the above methods.

According to the embodiments of the present invention, the user can visually check whether two components in a web application are linkable to each other. Moreover, after being linked, those two components work in concert with each other.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE PREFERRED EMBODIMENTS

Figure 1:
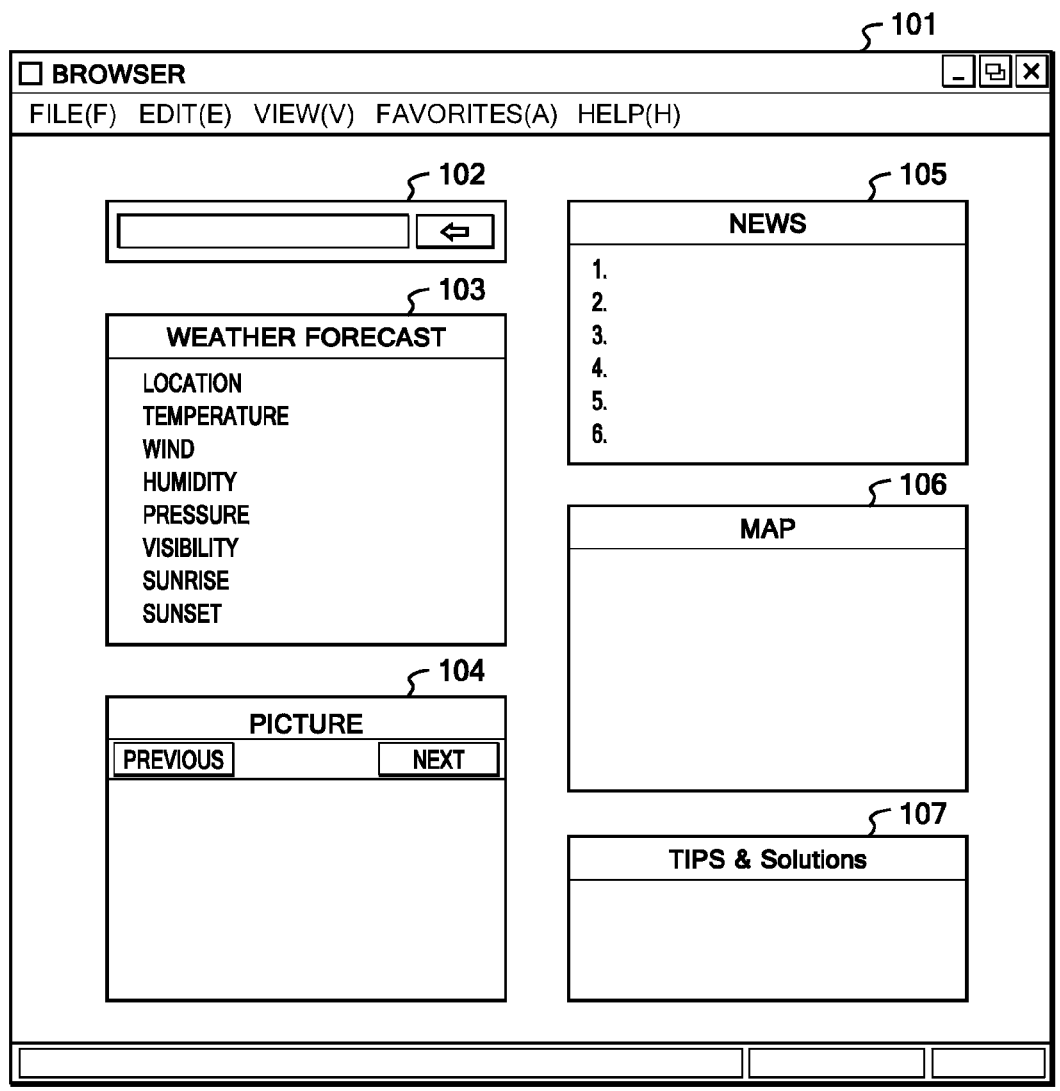
FIG. 1 shows an example of components in a web application.

In embodiments of the present invention, a "component" is a small application usable in a web application. A component is also called a widget or a gadget. A component is displayed as a single window in a web application. A web application includes multiple components. Typically, the components are provided by respective web services of different URLs. A web application gathers multiple web services to provide a new service to the user. The user can decide what components to place in the web application. The user also can change the location of a component, delete a component, insert a component, or replace a component. The insertion or location change of a component is carried out by dragging the component to a certain location in the web application.

In the embodiments of the present invention, the "component" is, for example, a "mashup component." To mash up means to create a new web service by combining multiple contents. The component includes, for example, a component for a product information site, a component for a weather forecast site, a component for a search site, a component for a news site, a component for a map site, and a component for a transfer guide site, but is not limited to these.

In the embodiments of the present invention, "to link up components" means to connect an output of a source component to an input of a target component so that the linked components may work in concert with each other. "To link" is also called "to wire."

In the embodiments of the present invention, a "component" typically includes a property. A "component" may also include an event. An event includes, for example, "pressing a button" and "selecting a line in a list box," but is not limited to these.

In the embodiments of the present invention, a "property" of a component is data indicating a property that the component has. Properties of a map component are, for example, an address (property name, "address") and a latitude/longitude (property name, "location"). A property is read-only in some cases, and is readable and rewritable in others.

In the embodiments of the present invention, "attribute information" is additional information that accompanies a property of a component. Attribute information is also called meta information. Attribute information is, for example, a type, an annotation, a constraint, or any combination of these, of a property of a component.

In the embodiments of the present invention, a "tag" is a short word or phrase assigned to a property of a component to give attribute information to the property. Assigning multiple tags to a property of a component allows the property to be assigned various pieces of attribute information, which can be used for property search or classification, for example. What is described in a "tag" is, for example, a type name, a property name, a constraint, an annotation, or a template. The user can assign any number of these tags to a property of a component. Assigning a tag is also called tagging.

In the embodiments of the present invention, a "type name" is the name of a data type. For example, the "type name" is "Integer" for integer-type data, and "String" for string-type data. A type name depends on a system.

In the embodiments of the present invention, a "property name" is the name of a property.

In the embodiments of the present invention, a "constraint" is a limitation of a range from which a data value can be taken. In a case of the integer type for example, the "constraint" limits the range from which a data value can be taken, to an integer value of, for example, 1 to 12.

In the embodiments of the present invention, an "annotation" expresses, as an annotation, what an item assigned the annotation means, in language comprehensible by humans.

In the embodiments of the present invention, a "template" is a kind of a constraint. A template expresses a pattern of data that a property receives as an input. Use of a template allows input data matching a format requested by the property to be created based on information of the template. For example, a template defines that an address is "city," "," and "state." In this case, the template is, for example, [<city>,<state>].

A "topic name" is, in a component performing publish/subscribe communications, the name of an address used by a component when publishing and subscribing messages. Publish/subscribe communications messaging system adopts the following mechanism. Specifically, the publisher of a message does not specify a subscriber explicitly, but publishes the message to a "topic," and the subscriber subscribes to the topic and thereby can receive the message.

In the embodiments of the present invention, a "link icon" is an icon for linking a source component to a target component.

A link icon for a source component (link-source icon) is an icon indicating that the source component is linkable to a target component. A link icon for a source component is, for example, a plug icon.

A link icon for a target component (link-target icon) is an icon indicating that the target component is linkable to a source component. A link icon for a target component is, for example, a socket icon.

A link-source icon can change its shape so as to be linkable to a link-target icon. For example, by the shape change, the link icon is displayed with its cable part extended.

In the embodiments of the present invention, a "link line" is displayed to link an output property of a source component to an input property of a target component to which the source component can be linked.

Based on the drawings, the embodiments of the present invention are described below. It is to be understood that these embodiments are given to describe preferred embodiments of the present invention, and are not intended to limit the scope of the present invention to what is shown herein. In addition, throughout the drawings, the same reference numerals denote the same objects, unless otherwise noted.

FIG. 1 shows an example of components in a web application.

A web application (101) includes multiple components (102 to 107).

The web application (101) is application software that runs on a web browser.

Each of the components (102 to 107) is a small application displayed in a single window in the web application (101).

The web application (101) shown in FIG. 1 includes the search-box component (102), the weather-forecast component (103), the picture component (104), the news component (105), the map component (106), and the TIPS & Solutions component (107).

Figure 2:
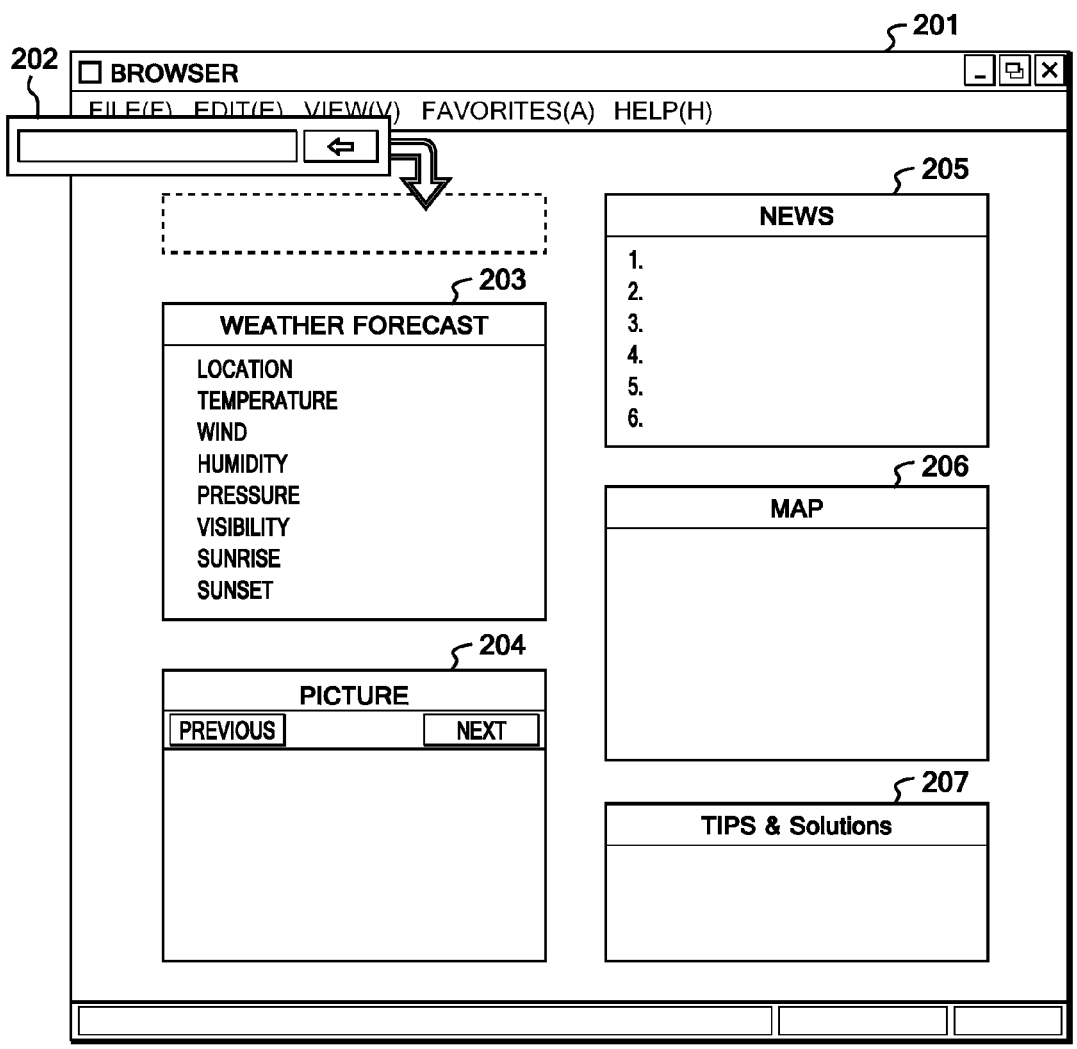
FIG. 2 shows an example of adding a component in a web application.

FIG. 2 shows an example of adding a component in a web application.

The user can add a component in a web application (201). For example, usable components are listed on a web page. Using an input device such as a mouse, the user selects a component (202) to add to the web application (201) from the list of components, drags and then drops the component (202) in the web application (201). The user can add a component in this way.

FIG. 2 shows how the search-box component (202) is added in the web application (201).

FIGS. 3A to 3I are views illustrating how a candidate to be linked with a component is presented, which is an embodiment of the present invention.

Figure 3A:
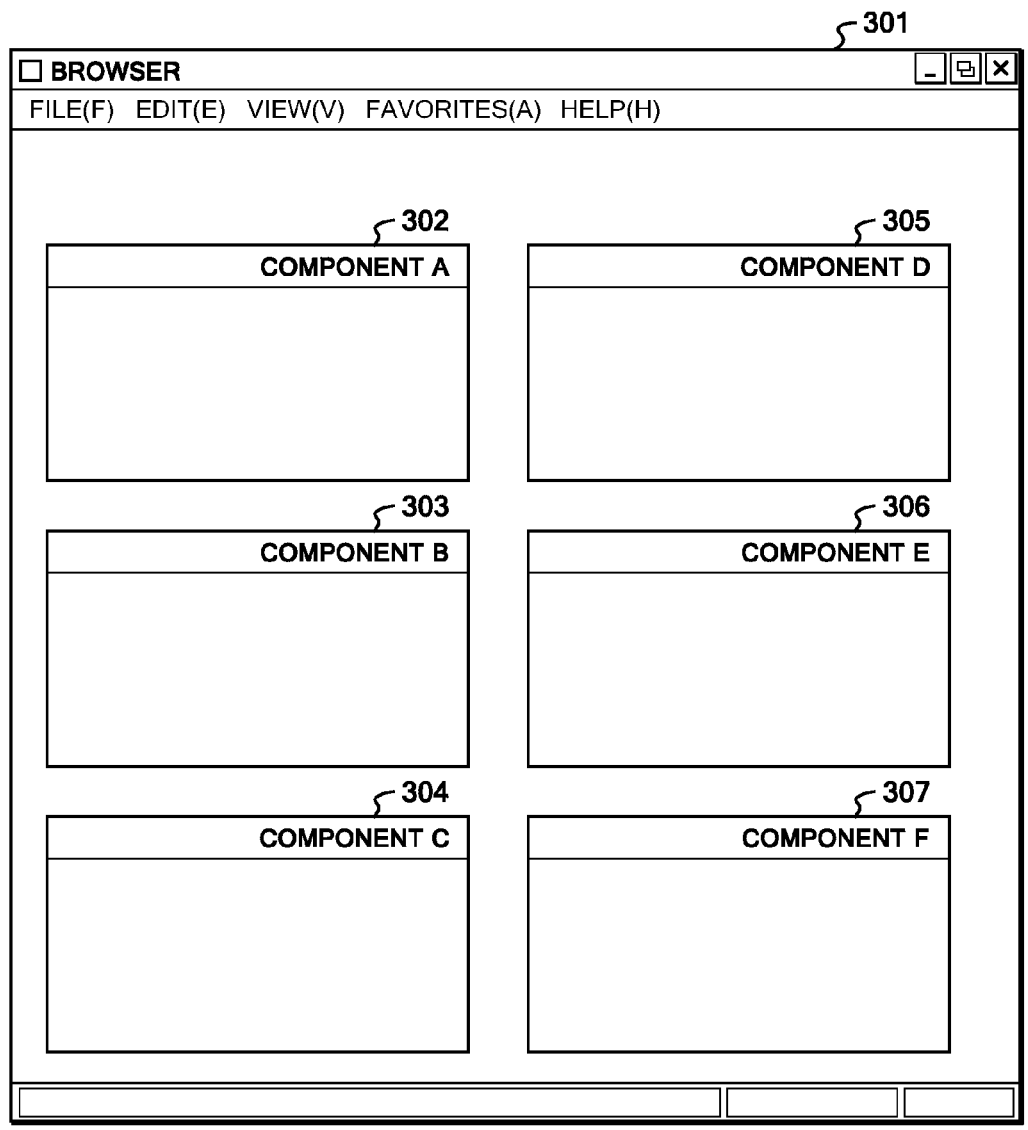
FIG. 3A is a view illustrating how a candidate to be linked with a component is presented, which is an embodiment of the present invention.

FIG. 3A shows that a web application (301) includes six components A to F (302 to 307). The browser displays the components A to F (302 to 307) in a so-called display mode. To link one component to another component, the user switches the mode from the display mode to a wiring edit mode. The mode switch from the display mode to the wiring edit mode is carried out on a menu display, for example.

Figure 3B:
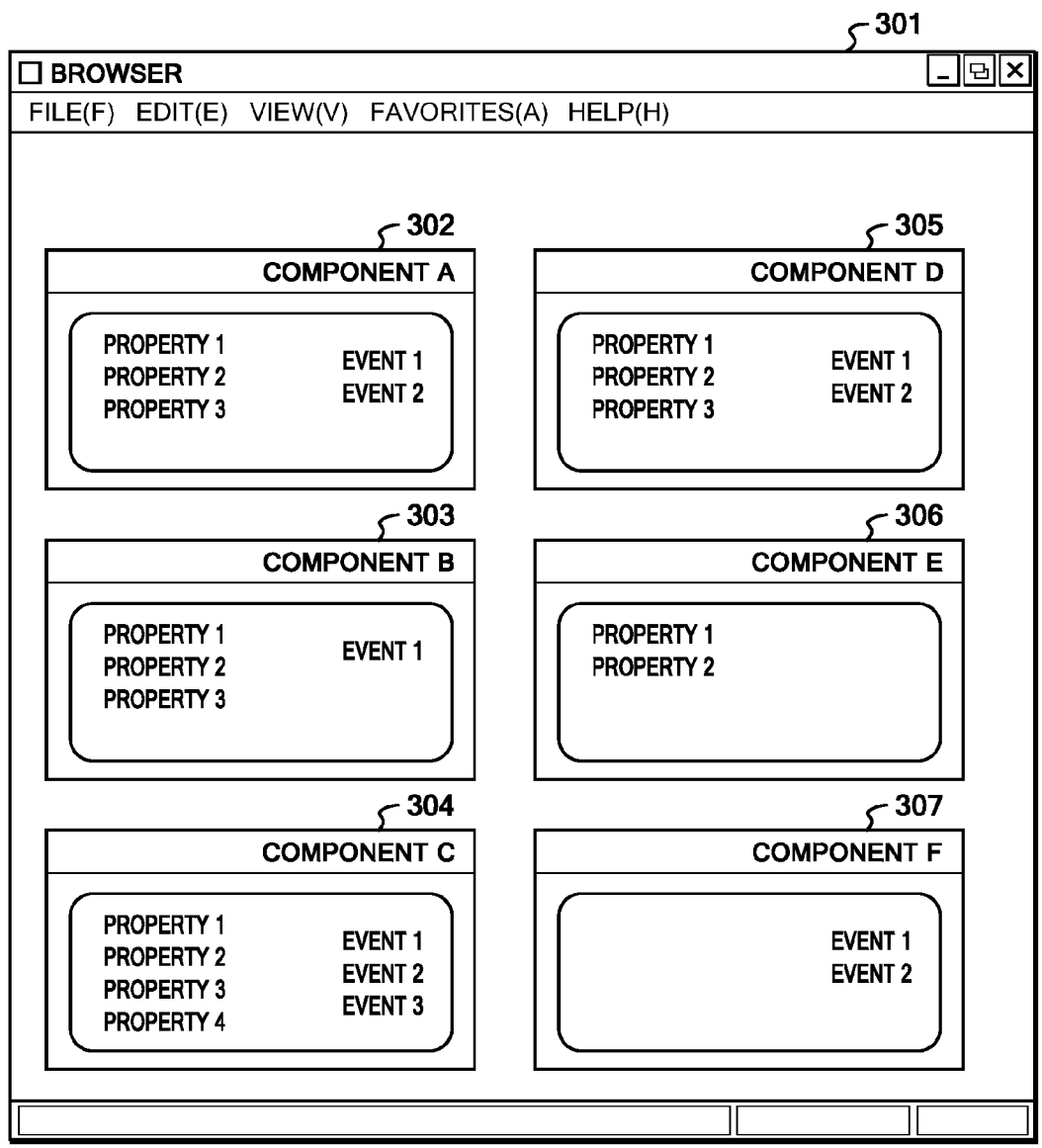
FIG. 3B is a view illustrating how a candidate to be linked with a component is presented, which is the embodiment of the present invention.

FIG. 3B shows an example of what the browser display looks like after the mode is switched to the wiring edit mode. The components A to D (302 to 305) have properties and events. The component E (306) has properties only. The component F (307) has events only. On each window of the components A to F (302 to 307), property names, event names, or both are displayed in a popup. The following description assumes that, in the examples in FIGS. 3B to 3I, what kind of data a component publishes to another component in response to occurrence of an event depends on each event.

Note that it is not decided at this point as to which component is a source component and which component is a target component. For example, when the user selects an event of a certain component, the certain component including the event thus selected becomes the source component, and other components become the target components. Note that, in the example in FIG. 3B, the component E (306) includes no event, and therefore cannot become the source component.

Figure 3C:
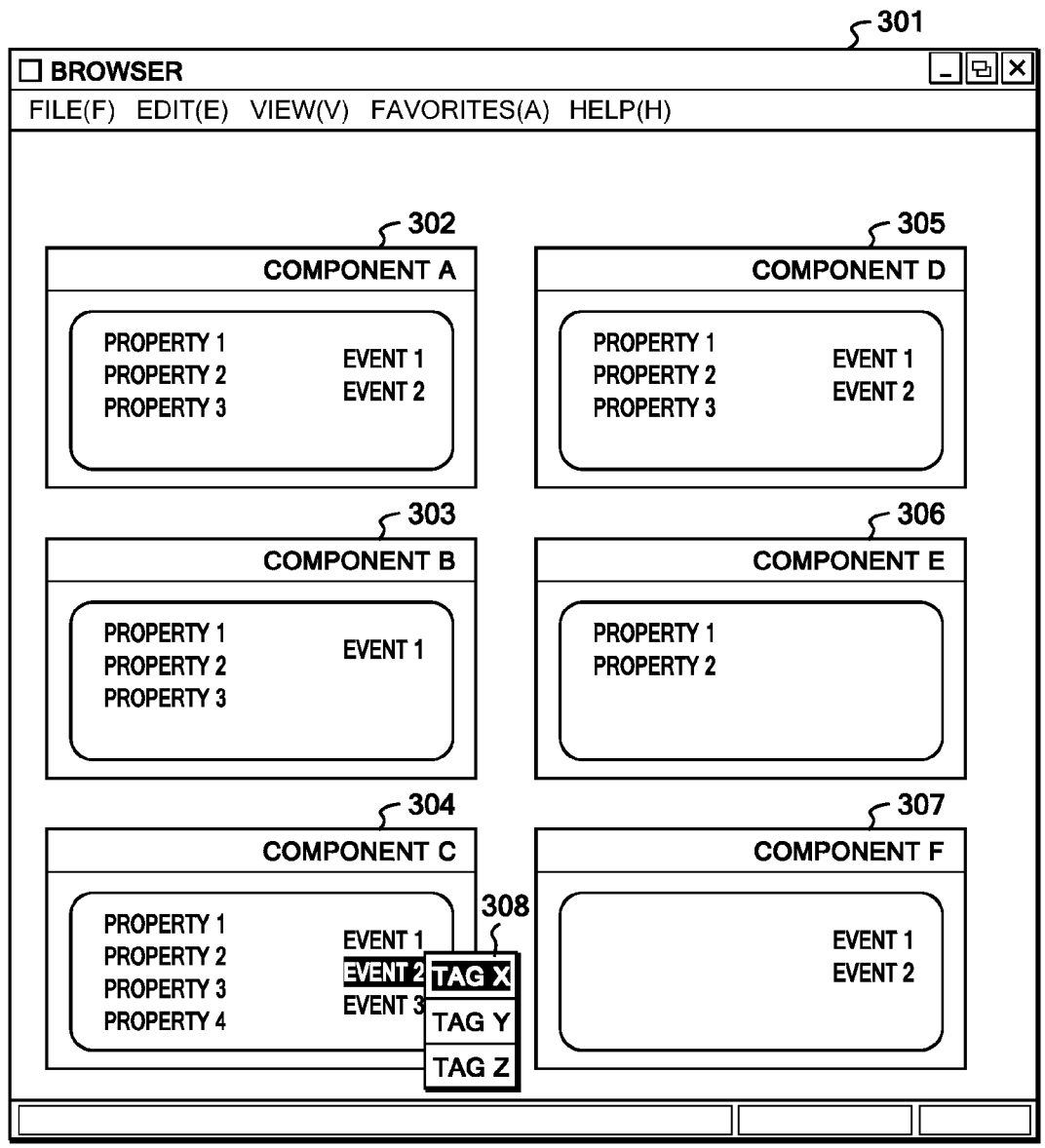
FIG. 3C is a view illustrating how a candidate to be linked with a component is presented, which is the embodiment of the present invention.

FIG. 3C shows an example of displaying a list of tags. For example, the user clicks the right mouse button on the display of Event 2 of the component C (304). In response to the click, tags assigned to each property of the components other than the component C (304), namely, the components A, B, D to F (302, 303, 305 to 307) are collected dynamically. Note that no tag is collected from the component F (307) since the component F (307) has no property.

Tags X, Y, and Z thus collected are then associated with the component C (304). A list of the collected tags (308) is displayed in association with the selected event of the component C (304). What should be noted here is that the tags assigned to the properties of the component C (304) are irrelevant to the tags collected dynamically. In other words, what tags are assigned to the properties of the component to be the source component (the component C (304) in this example) has no influence on which tags to be collected for presenting target components, being the link-target candidates.

Figure 3D:
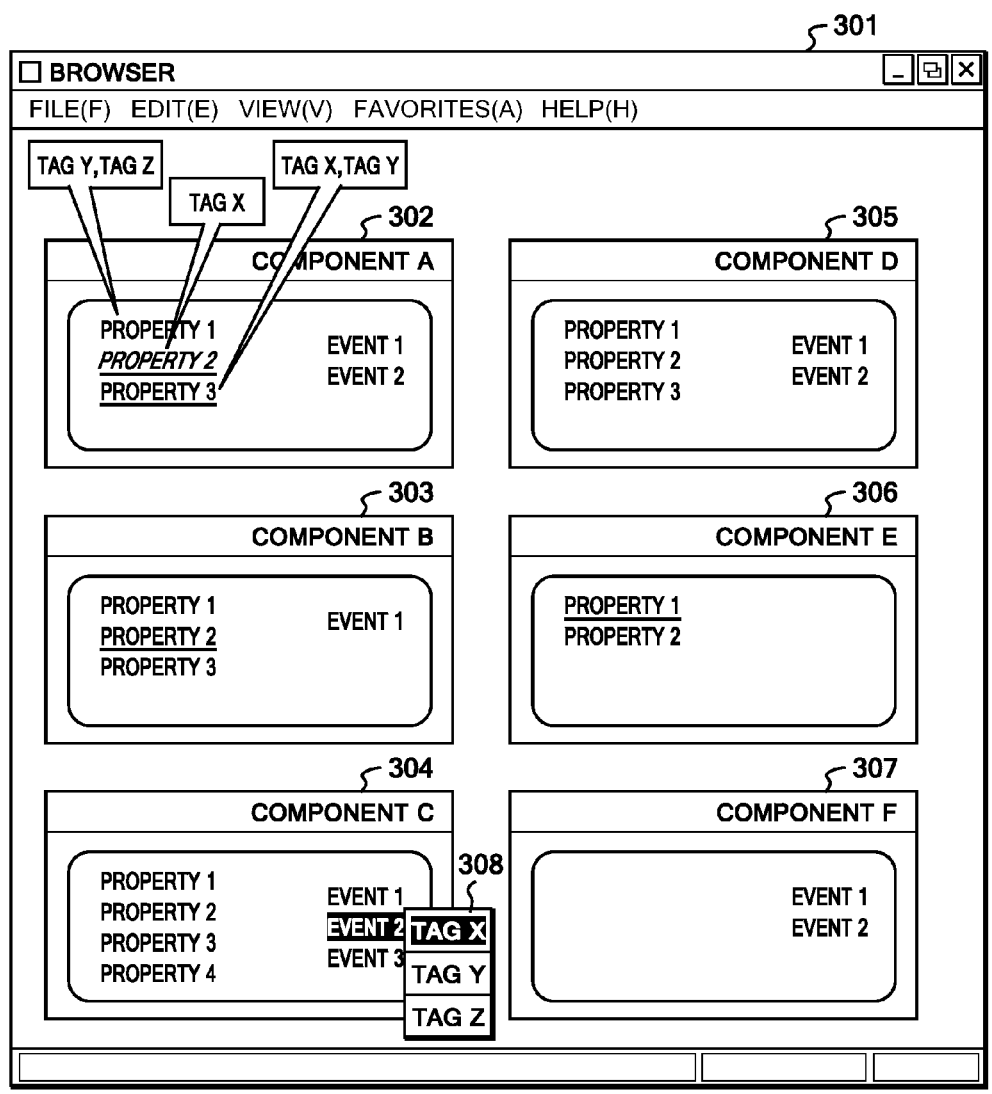
FIG. 3D is a view illustrating how a candidate to be linked with a component is presented, which is the embodiment of the present invention.

FIG. 3D shows an example where the user selects Tag X, and as a result, the properties including Tag X are identified. Assume that the user has selected Tag X from the list of tags. In response to Tag X being selected, a property including only Tag X is shown in italics with an underline, for example. Moreover, a property including Tag X and other tags is shown with an underline, for example. A property including no Tag X is shown with no change. For example, by such display change of the properties, properties including Tag X selected by the user on the component C are identified on the target components. Then, the component C (304) can be linked to any component including the property thus identified.

In FIG. 3D, Property 1 of the component A (302) is assigned Tags Y and Z; Property 2 thereof is assigned Tag X; and Property 3 thereof is assigned Tags X and Y. Although the tags assigned to each property are shown in a popup in FIG. 3D, such display is to facilitate illustration, and what tags are assigned is usually not displayed. Property 2 of the component A (302) includes only Tag X which has been selected, and therefore is shown in italics with an underline. Property 3 of the component A (302) includes Tag X which has been selected and Tag Y, and therefore is shown with an underline. Property 1 of the component A (302) does not include Tag X, and therefore is shown with no change.

Figure 3E:
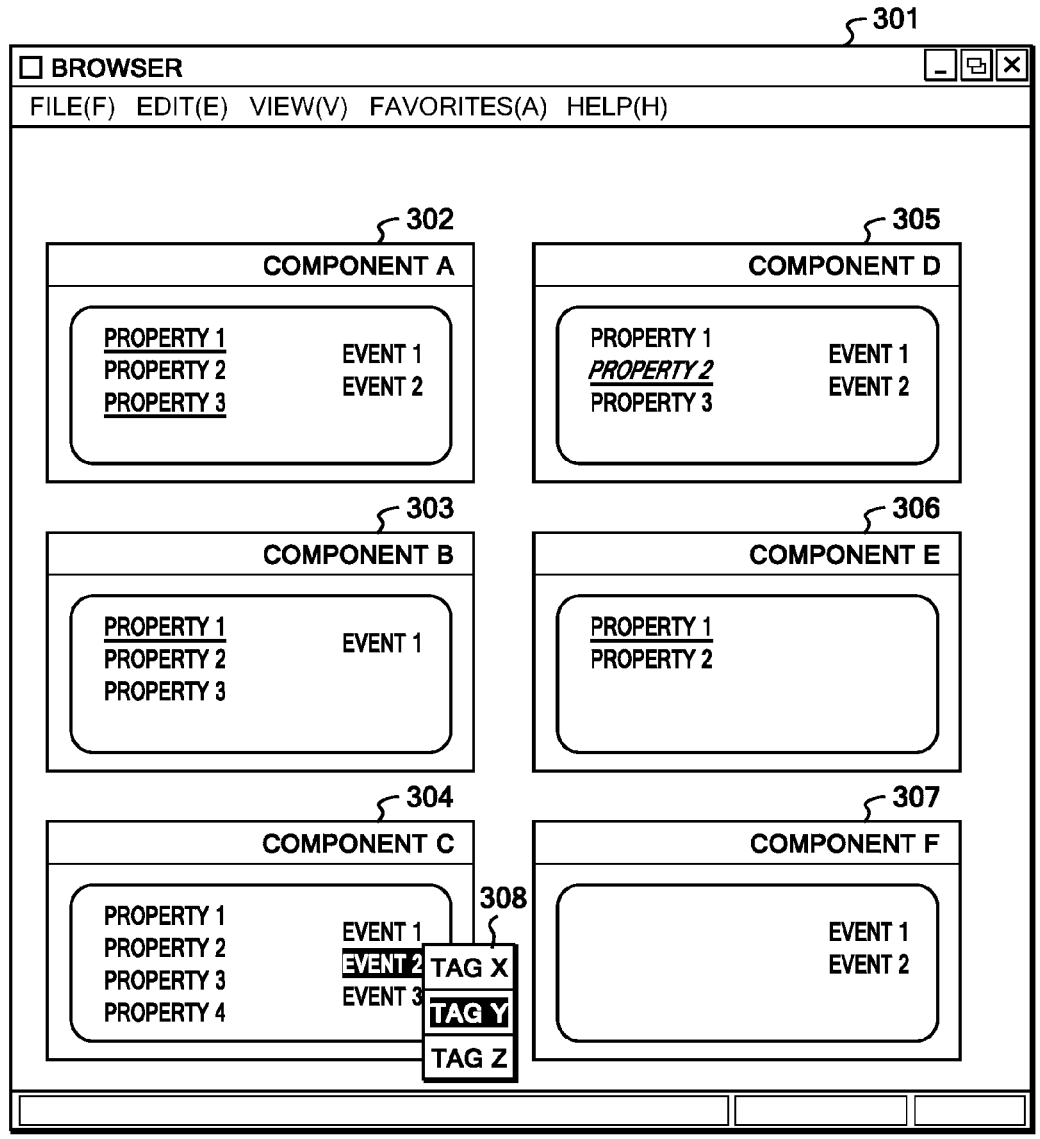
FIG. 3E is a view illustrating how a candidate to be linked with a component is presented, which is the embodiment of the present invention.

FIG. 3E shows an example where the user selects Tag Y, and as a result, the properties including Tag Y are identified. For example, the user clicks the right mouse button on the display of Event 2 of the component C (304). Since the tags assigned to each property of the components other than the component C (304), that is, the components A, B, D to F (302, 303, 305 to 307) have already been collected, they are not dynamically collected this time. In response to the right click, a list of the collected tags (308) is displayed in association with Event 2 of the component C (304).

Assume that the user selects Tag Y from the list of the tags. In response to Tag Y being selected, a property including only Tag Y is shown in italics with an underline, for example. Moreover, a property including Tag Y and other tags is shown with an underline, for example. A property including no Tag Y is shown with no change. For example, by such display change of the properties, properties including Tag Y selected on the component C (304) are identified on the target components. Then, the component C (304) can be linked to any component including the property thus identified.

Figure 3F:
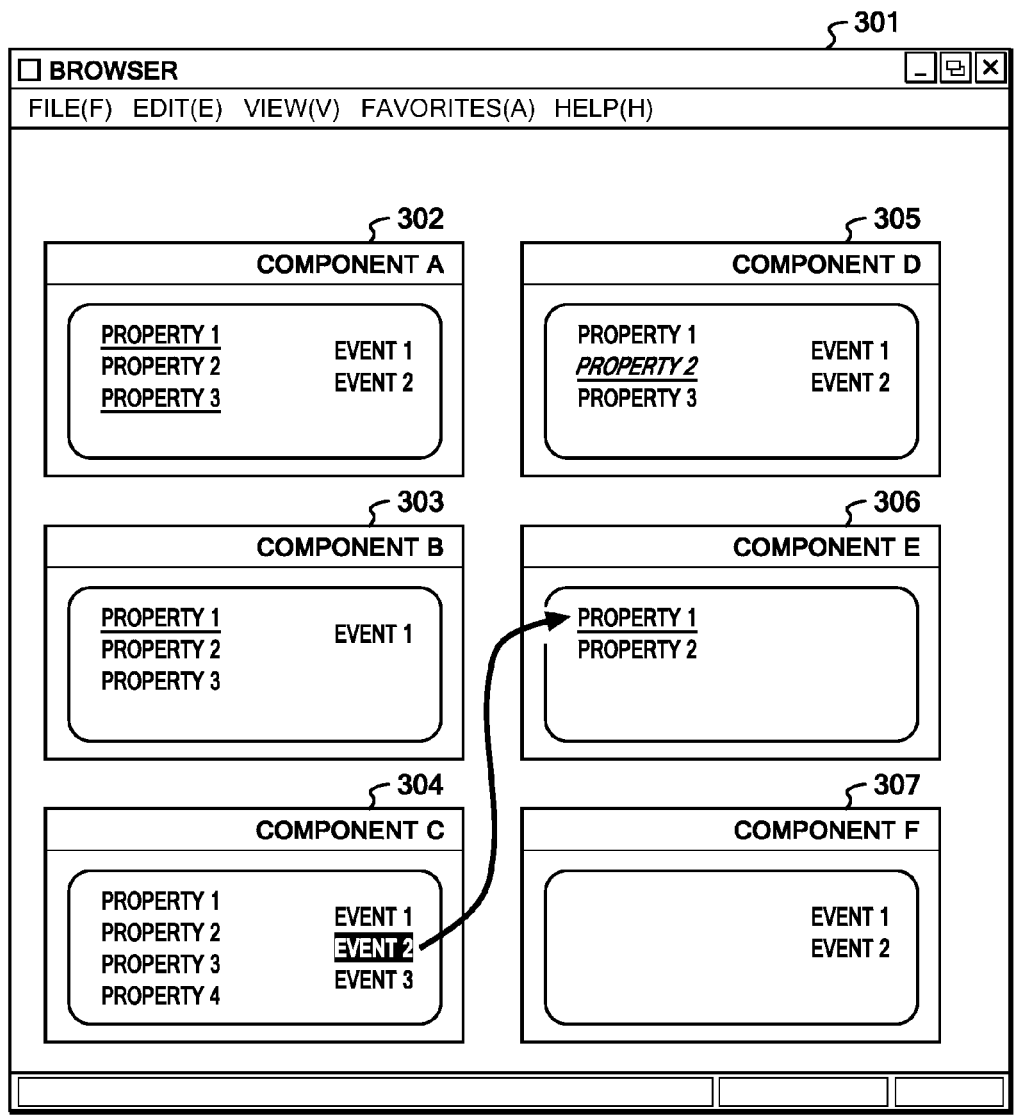
FIG. 3F is a view illustrating how a candidate to be linked with a component is presented, which is the embodiment of the present invention.

FIG. 3F shows an example of linking the selected event of the source component to the identified property. The user links Event 2 of the component C (304), which is the source component, to Property 1 of the component E (306) identified as including Tag Y as illustrated in FIG. 3E. Specifically, using a mouse or the like, the user drags an indication (e.g., an icon) of Event 2 and drops it on the display of Property 1. A link line is displayed between Event 2 and Property 1 of the component E (306) by the dragging. Event 2 of the component C (304) is linked to Property 1 of the component E (306) in such a manner. Accordingly, in response to the occurrence of Event 2 of the component C (304), data associated with Event 2 is sent to the component E (306), and information based on that data is then displayed on the component E (306). The following case is illustrated as an example: the component C (304) and the component E (306) are an address-book component and a business-card component, respectively, and an event is the user selecting a name in a name field in the address-book component C (304). First, the user selects a name in a name field in the component C (304). This selection is an event. Accordingly, in response to the event, user data associated with that event is published from the component C (304) to the component E (306). The component E (306) subscribes to the user data, and displays detailed information corresponding to that user data received.

Figure 3G:
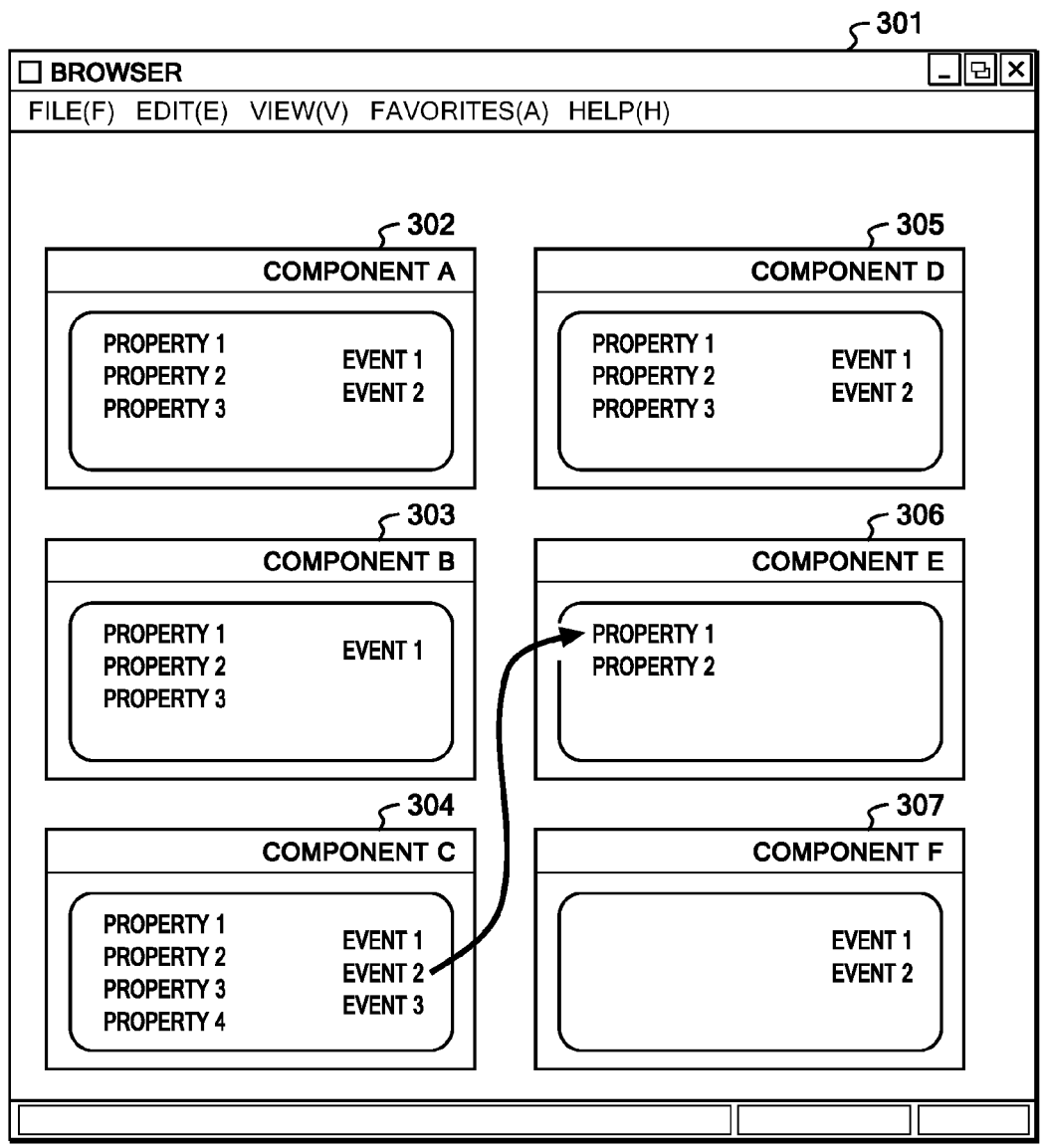
FIG. 3G is a view illustrating how a candidate to be linked with a component is presented, which is the embodiment of the present invention.

FIG. 3G shows completion of the linkage illustrated in FIG. 3F. A link line is displayed between Event 2 of the component C (304) and Property 1 of the component E (306). To end the wiring edit mode, the user switches the mode from the wiring edit mode to the display mode.

Figure 3H:
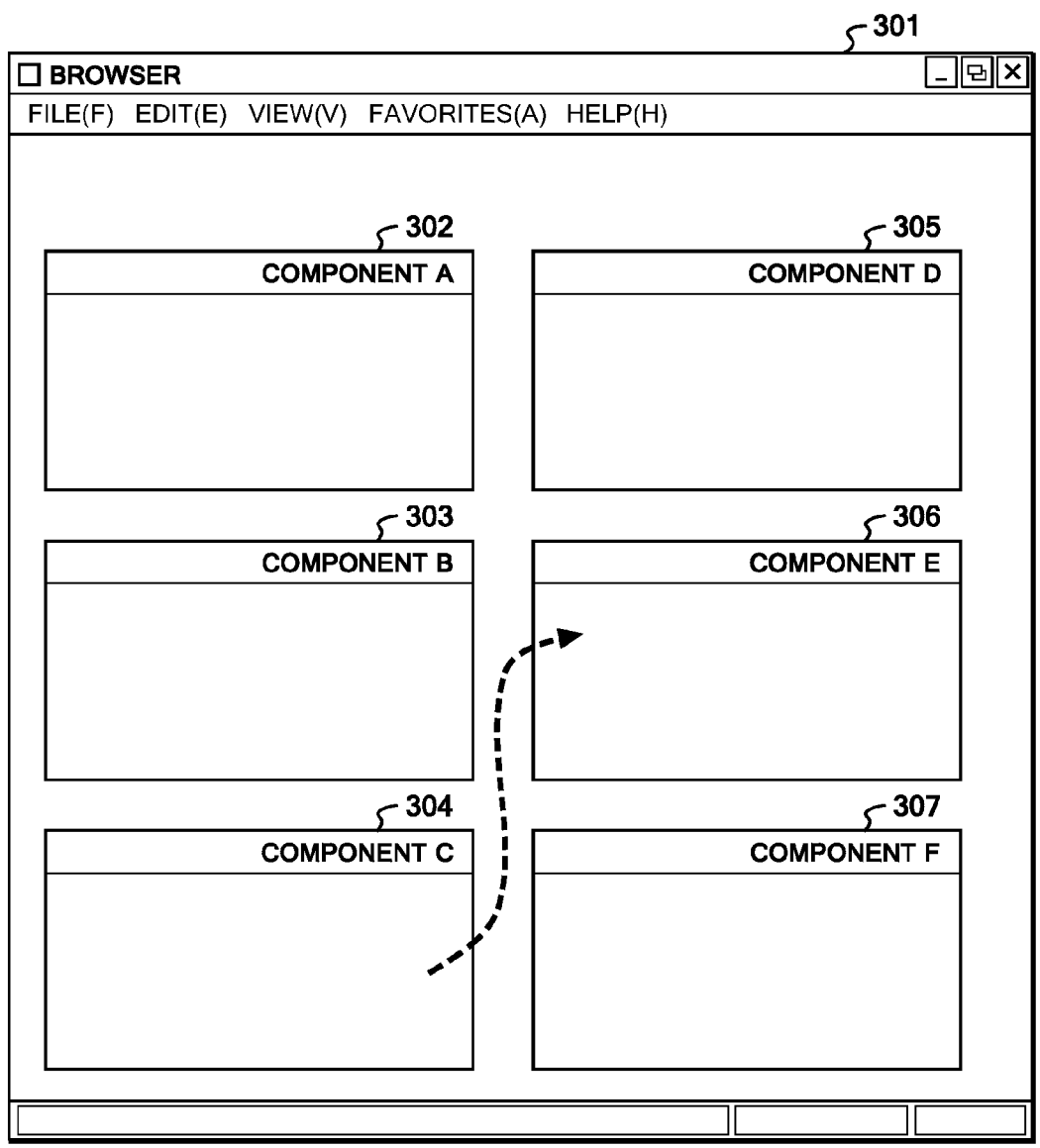
FIG. 3H is a view illustrating how a candidate to be linked with a component is presented, which is the embodiment of the present invention.

FIG. 3H shows a browser screen after the mode is switched from the wiring edit mode to the display mode. The screen shown in FIG. 3H is not different from the screen shown in FIG. 3A at all. In FIG. 3H, however, the component C (304) is linked to the component E (306); accordingly, when Event 2 occurs in the component C (304), the component E (306) operates in response to it.

Figure 3I:
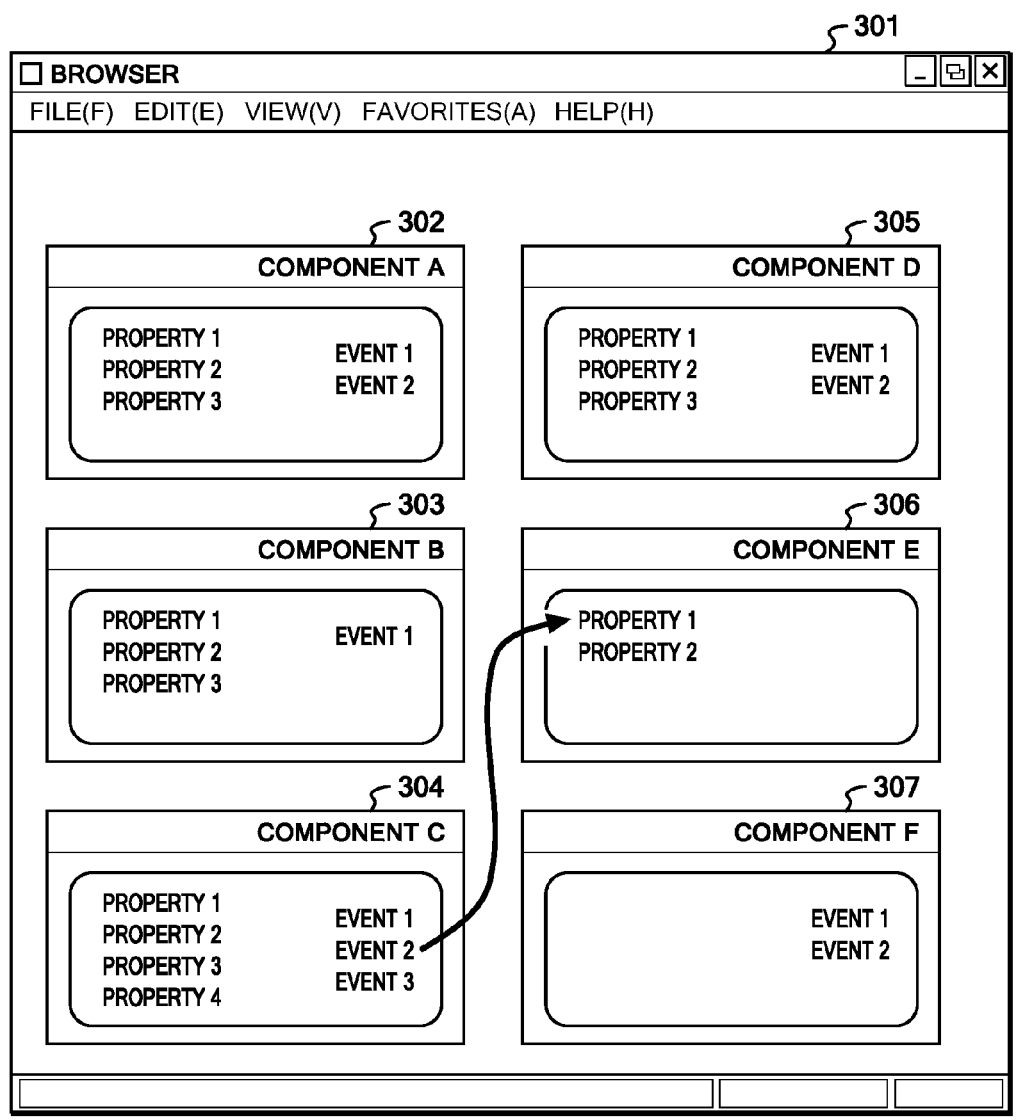
FIG. 3I is a view illustrating how a candidate to be linked with a component is presented, which is the embodiment of the present invention.

FIG. 3I shows a browser screen after the mode is switched again from the display mode to the wiring edit mode. In the wiring edit mode, the link between the component C (304) and the component E (306) can be checked. In other words, the link between the component C (304) and the component E (306) is maintained.

Figure 4A:
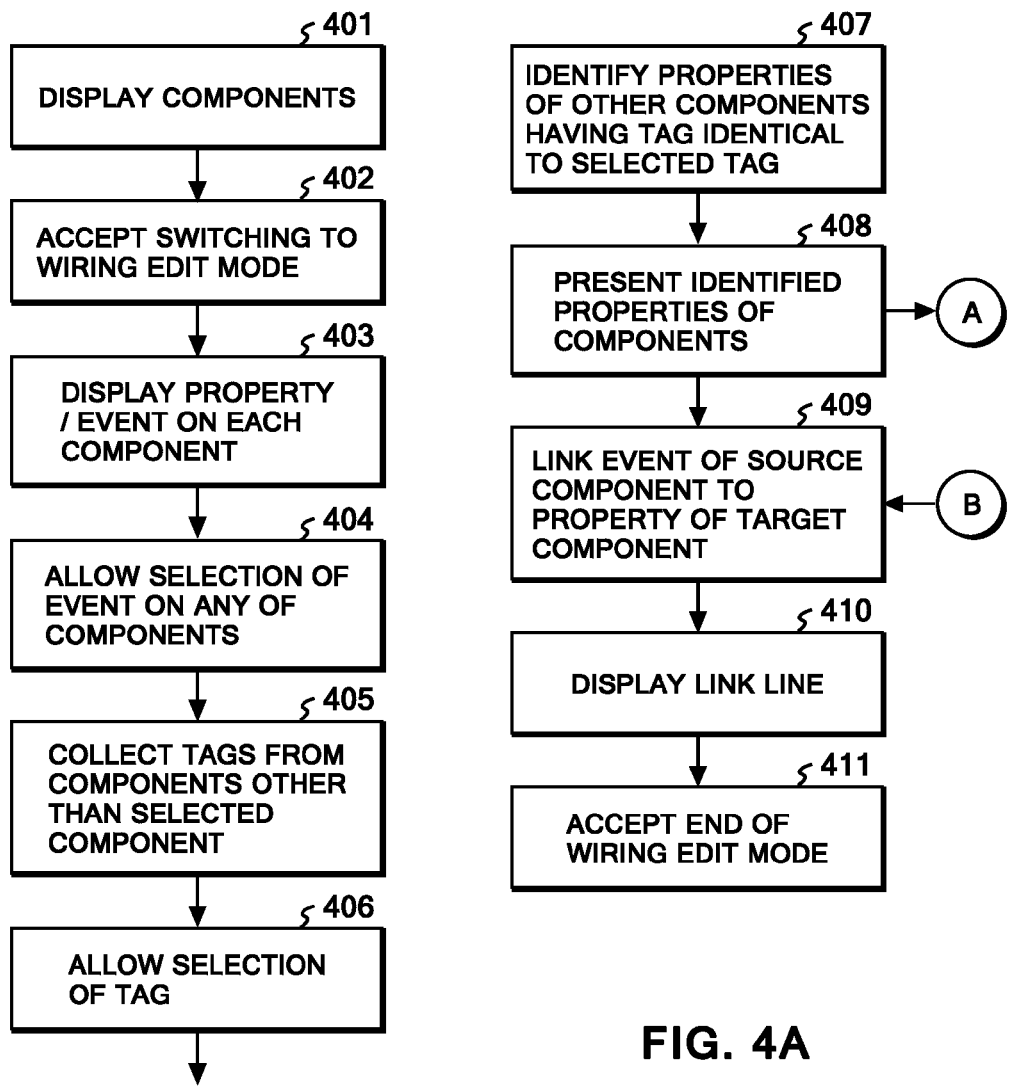
FIG. 4A shows a flowchart of a method of presenting a candidate to be linked with a component when the component is to be linked to another component, which is an embodiment of the present invention.

FIG. 4A shows a flowchart of a method of presenting a candidate to be linked with a component when the component is to be linked to another component, which is an embodiment of the present invention.

In Step 401, a computer system displays multiple components in a web application. The components are stored in a storage device in the computer system through a network, for example. A property of each component is assigned a tag. The tag assignment may be performed either on the same computer system that performs the wiring edit, or on a different computer system.

In Step 402, the computer system accepts, from the user, switching from the display mode to the wiring edit mode. The processing goes to Step 403 in response to the mode switch.

In Step 403, in response to the mode switch, on each of the components, properties, events, or both of the component are displayed.

In Step 404, the computer system allows the user to select an event displayed on any of the components.

In Step 405, in response to the event selection, the computer system collects tags from properties of components other than the component having the selected event.

In Step 406, the computer system creates a list of the collected tags and displays the list near the display of the selected event. The user can select a tag from the list.

In Step 407, the computer system identifies properties, of other components, having the same tag as the selected tag.

In Step 408, the computer system displays the identified properties in such a manner that the user can visually recognize them. For example, the computer system displays the identified properties with highlights, with color change, or with icons.

Then, the processing may go to Step 421, which is an optional step, to calculate a tag similarity.

In Step 409, in response to an instruction by the user, the computer system links the user-selected event of the source component to a property selected by the user from the identified properties.

In Step 410, the computer system displays a link line between the user-selected event of the source component and the property selected by the user from the identified properties.

In Step 411, the computer system accepts the switching made by the user from the wiring edit mode to the display mode. In response to the mode switch, the computer system ends the wiring edit mode.

Figure 4B:
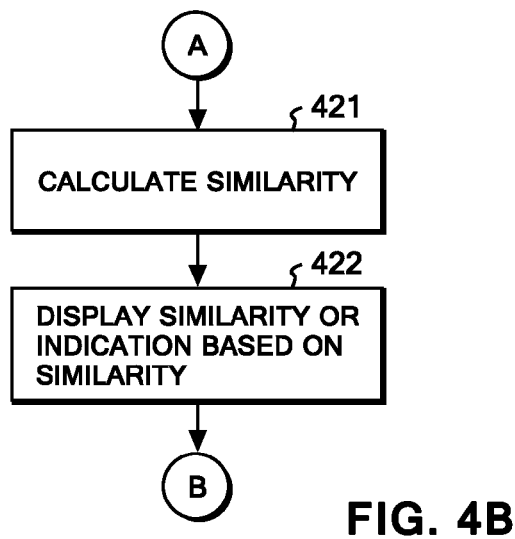
FIG. 4B is a flowchart of a method of calculating a tag similarity, which is an embodiment of the present invention.

FIG. 4B is a flowchart of a method of calculating a tag similarity, which is an embodiment of the present invention.

In Step S421, the computer system checks the selected tag against tags included in each property of the target components, and calculates a similarity therebetween. For example, the similarity is calculated according to: {(the number of tags matching the selected tag)/the number of tags assigned to a property of the target component)}×100(%); or {the number of tags matching the selected tag (1)/the number of tags selected on the source component}×100(%).

In Step 422, the computer system displays either the calculated similarity itself or an indication based on the similarity, on or near the display of each of the identified properties.

After completion of Step 422, the computer system returns to Step 409 in FIG. 4A.

Figure 5:
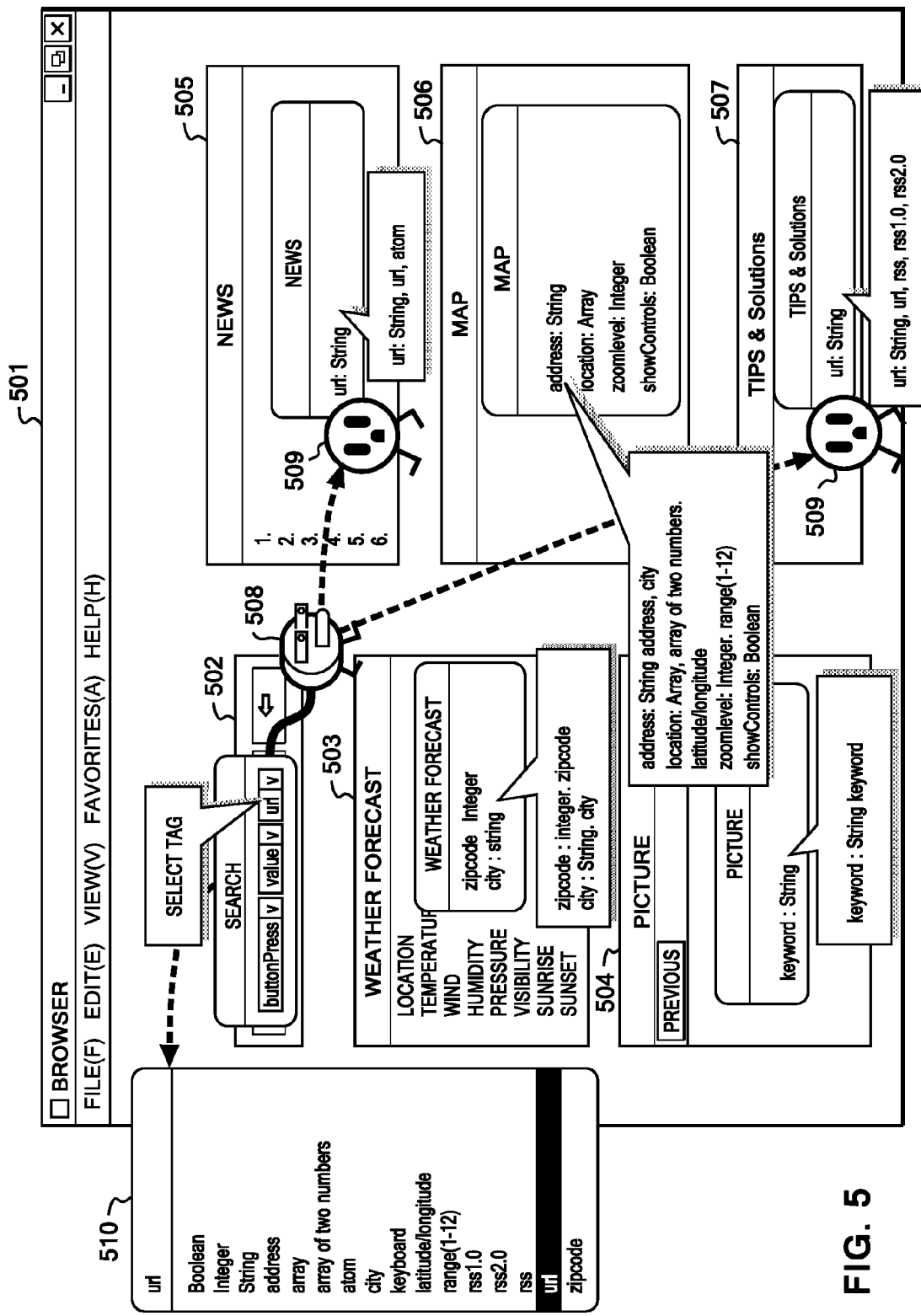
FIG. 5 shows a method of narrowing down candidates to be linked with a source component, using a tag, which is an embodiment of the present invention.

FIG. 5 shows how candidates to be linked with a source component (502) are narrowed down using a tag, which is an embodiment of the present invention.

As a list (510), a list of tags selectable by the user is displayed on the source component (502). The selectable tags are collected from the properties of all target components (503 to 507) other than the source component (502). The list of tags is displayed in, for example, a pull-down menu.

In FIG. 5, the tags displayed as examples are Boolean, Integer, String, address, array of two numbers, atom, city, keyword, latitude/longitude, ranges (1-12), rss1.0, rss2.0, rss, url, and zip code. The user can select a tag from the list on the source component (502). In FIG. 5, the tag, url, is selected by the user, and accordingly, the letters, url, are highlighted.

In FIG. 5, the dotted arrows and the bubbles are shown for illustrative purposes, and do not necessarily have to be displayed in actual applications.

Input properties, of the target components (505 and 507), having the same tag as the selected tag "url" of the source component (502) are highlighted, or a link-target icon (509) is displayed on or near each of those input properties.

Display of the link-target icons allows the user to easily check the properties of the target components (505 and 507) that can be linked with the source component (502).

Figure 6:
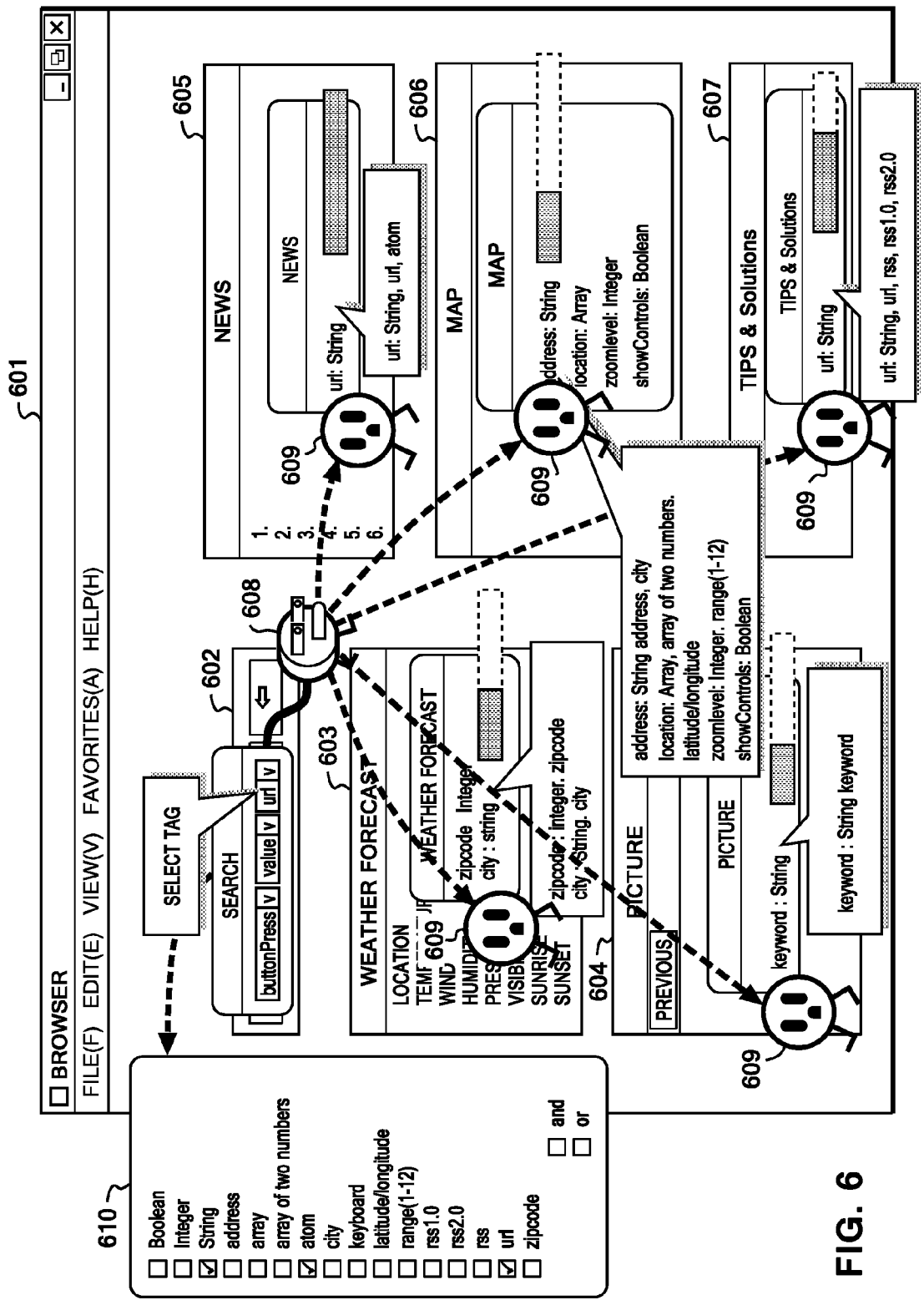
FIG. 6 shows a method of narrowing down candidates to be linked with a source component, by using multiple tags, which is an embodiment of the present invention.

FIG. 6 shows a method of narrowing down candidates to be linked with a source component (602), by using multiple tags, which is an embodiment of the present invention.

As a list (610), a list of tags selectable by the user is displayed on the source component (602). The selectable tags are collected from the input properties of all target components (603 to 607) other than the source component (602). The list of tags is displayed in, for example, a pull-down menu. To allow two or more tags to be selected, each tag is provided with a check box (610), for example. The user is allowed to select one tag or more.

In addition to selecting multiple tags, the user may specify which condition to use, an AND condition, an OR condition, or both.

In FIG. 6, three tags, specifically, "String," "atom," and "url" are selected by the user.

In response to the tag selection, input properties, of the target components (603 to 607), having the same tag as at least one of the selected tags, "String," "atom," and "url," are highlighted, or a link-target icon (609) is displayed on or near each of those input properties.

In FIG. 6, a similarity is further displayed for each of the target components (603 to 607) having the same tag as any of the selected tags.

In the weather-forecast component (603), "String" matches one of the selected tags. Thus, the matching degree is: {the number of matching tags (1)/the number of tags selected on the source component (602) (3)}×100=33%.

In the picture component (604), "String" matches one of the selected tags. Thus, the matching degree is: {the number of matching tags (1)/the number of tags selected on the source component (602) (3)}×100=33%.

In the news component (605), "String," "atom," and "url" all match the selected tags. Thus, the matching degree is: {the number of matching tags (3)/the number of tags selected on the source component (602) (3)}×100=100%.

In the map component (606), "String" matches one of the selected tags. Thus, the matching degree is: {the number of matching tags (1)/the number of tags selected on the source component (602) (3)}×100=33%.

In the TIPS & Solutions component (607), "String" and "url" match the selected tags. Thus, the matching degree is: {the number of matching tags (2)/the number of tags selected on the source component (602) (3)}×100=66%.

In one embodiment, for example, the matching degree is expressed with a bar, as shown in FIG. 6. For example, in a bar, the percentage of the match is expressed in solid lines, while the percentage of the non-match is expressed in broken lines. In another embodiment, the matching degree can be expressed in numbers. In another embodiment, a mark of any of three colors, red, yellow, and green, which depends on the percentage of the match, may be attached to the link-target icon of each target component. For example, a red mark is attached when the matching degree is 0% to less than 35%; a yellow mark, 35% to less than 70%; and a green mark, 70% to 100%.

In addition, for the calculation of the matching degree, a weight may be assigned to each tag in advance.

Figure 7A:
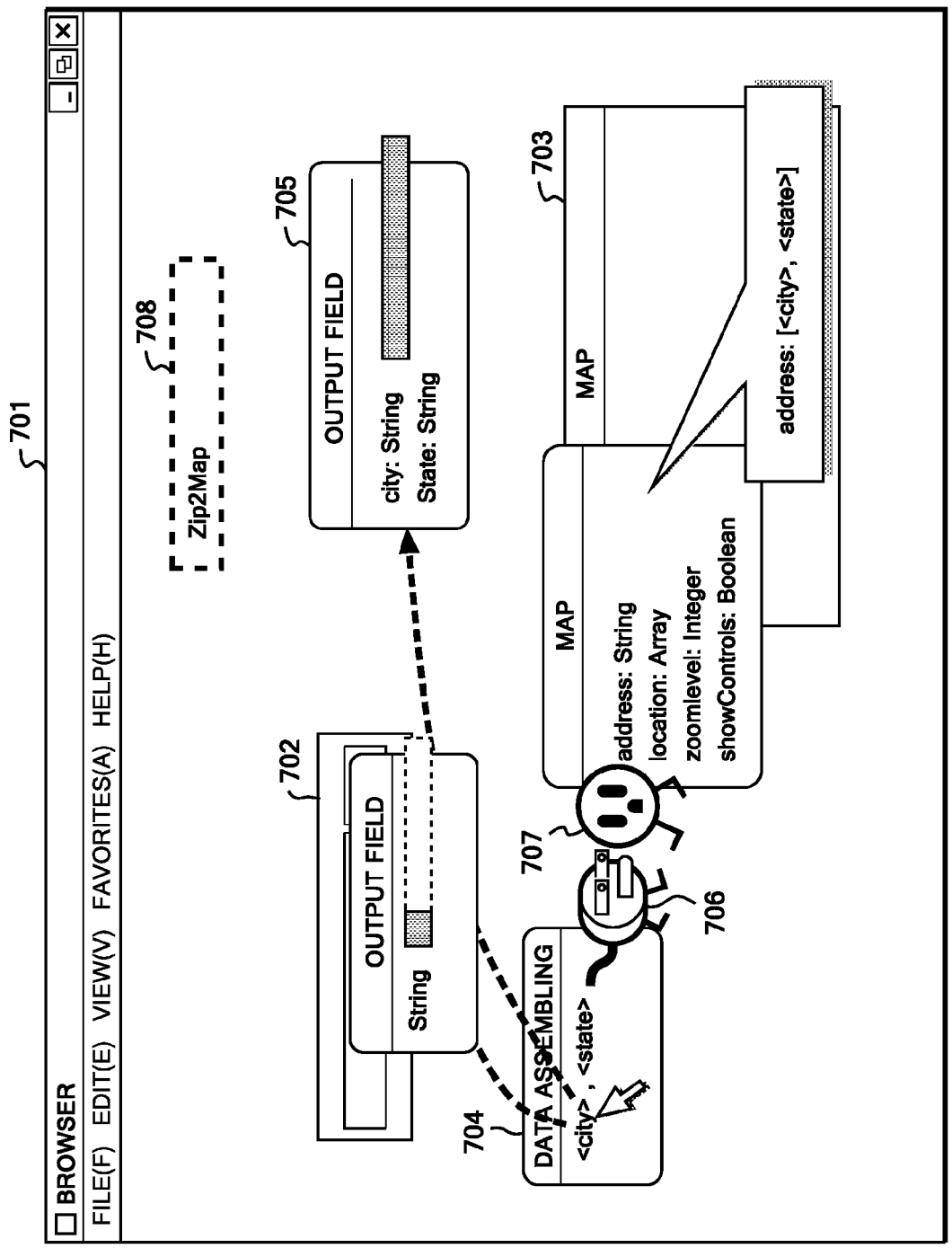
FIG. 7A shows a method of linking a target component to a source component by using a template, which is an embodiment of the present invention.
Figure 7B:
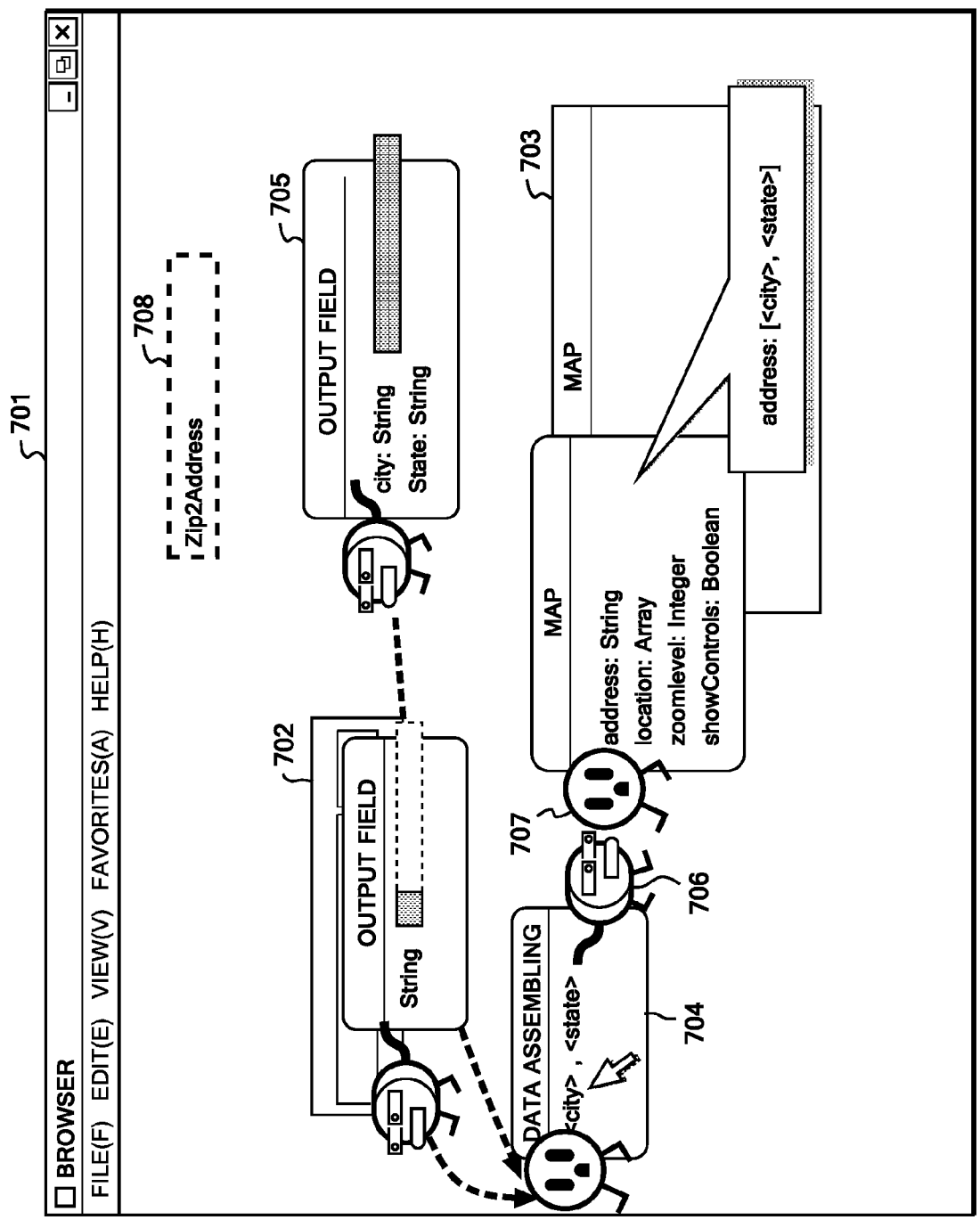
FIG. 7B shows a method of linking a target component to a source component by using a template, which is the embodiment of the present invention.

FIGS. 7A and 7B each show a method of linking a target component to a source component by using a template, which is an embodiment of the present invention.

A Zip2Address (708) represents one web service. Zip2Address is a service that converts a zip code into an address (i.e., a city and a state). The Zip2Address (708) is surrounded by broken lines to indicate that this web service is not visually represented. Zip2Address service receives input of a zip code for example, and outputs two data, a city name and a state name.

The following scenario is considered below. Using tag information, two outputs of the Zip2Address (708) service are combined on a data assemble panel (704) to obtain an address input, "San Diego, Calif.," for example. Since each of the outputs cannot be used as-is as an address input, the outputs are joined together with a comma using data assembling and thus combined to obtain the address input.

Step 1

With an address property on a map panel (707) being designated, the data assemble panel (704) is displayed. When the data assemble panel (704) is displayed, an output of the data assemble panel (704) is being linked to an address property of the map panel (707).

Step 2

Information, [<city>, <state>], is displayed on the data assemble panel (704). This information is read from a template assigned to the address property. The <city> and <state> are each selectable.

Step 3

First, the user selects <city> in the data assemble panel (704). In response to the selection, a similarity against each of output properties of other selectable components on the screen is calculated based on the tag information, <city>, and on the type information, String. Then, either the similarity itself or an indication based on the similarity (a bar is used in FIG. 7A) is displayed onscreen (FIG. 7A). As soon as <city> is selected, a link-target icon is displayed near [<city>], and a link-source icon is displayed next to each property of the component (702) and the component (705) (FIG. 7B).

Step 4

Referring to the similarities, the user links the link-source icon to the link-target icon for <city>.

Figure 8A:
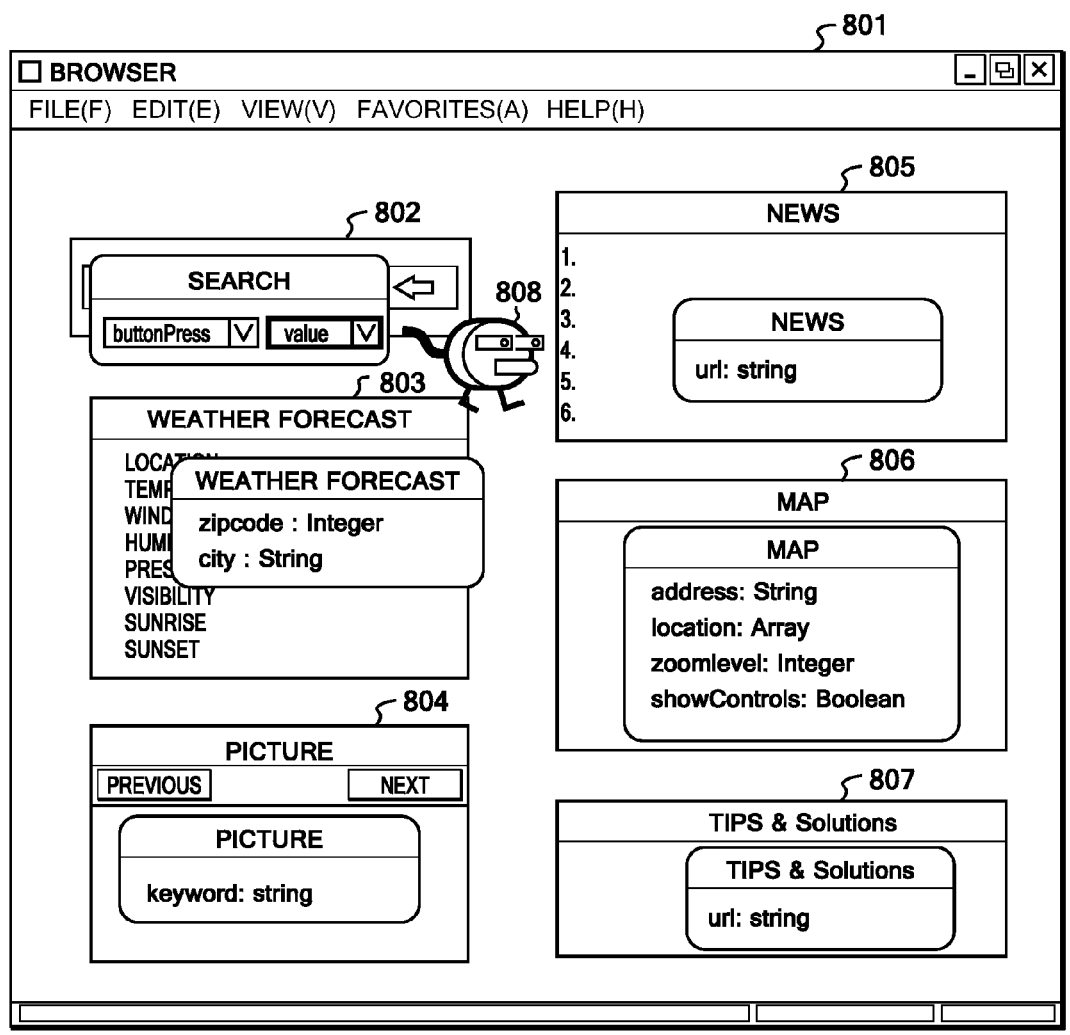
FIG. 8A shows how candidates to be linked with a source component are narrowed down using attribute information, which is a different embodiment of the present invention.

FIG. 8A shows a method of narrowing down candidates to be linked with a source component, by using attribute information, which is a different embodiment of the present invention.

A search-box component (802) is a component that gives a search parameter to other components in a web application.

The component which initiates the linkage becomes the source component, and therefore, in FIG. 8A, the search-box component (802) is the source component. Then, other components (803 to 807) are the target components.

In FIG. 8A, a link-source icon (808) is displayed for the source component (802).

In the source component (802), an event and an output property, which are to be a trigger, are selectable. What kind of output property the source component (802) has depends on the source component (802). The user can select at least one of the output properties of the component. For example, when the component has output properties, value1, value2, and value3, the user can select at least one of those output properties, value1, value2, and value3.

Each of the target components (803 to 807) has an input property. For example, the map component (806) has address, location, zoomLevel, and showControls, as properties that receive data input.

Figure 8B:
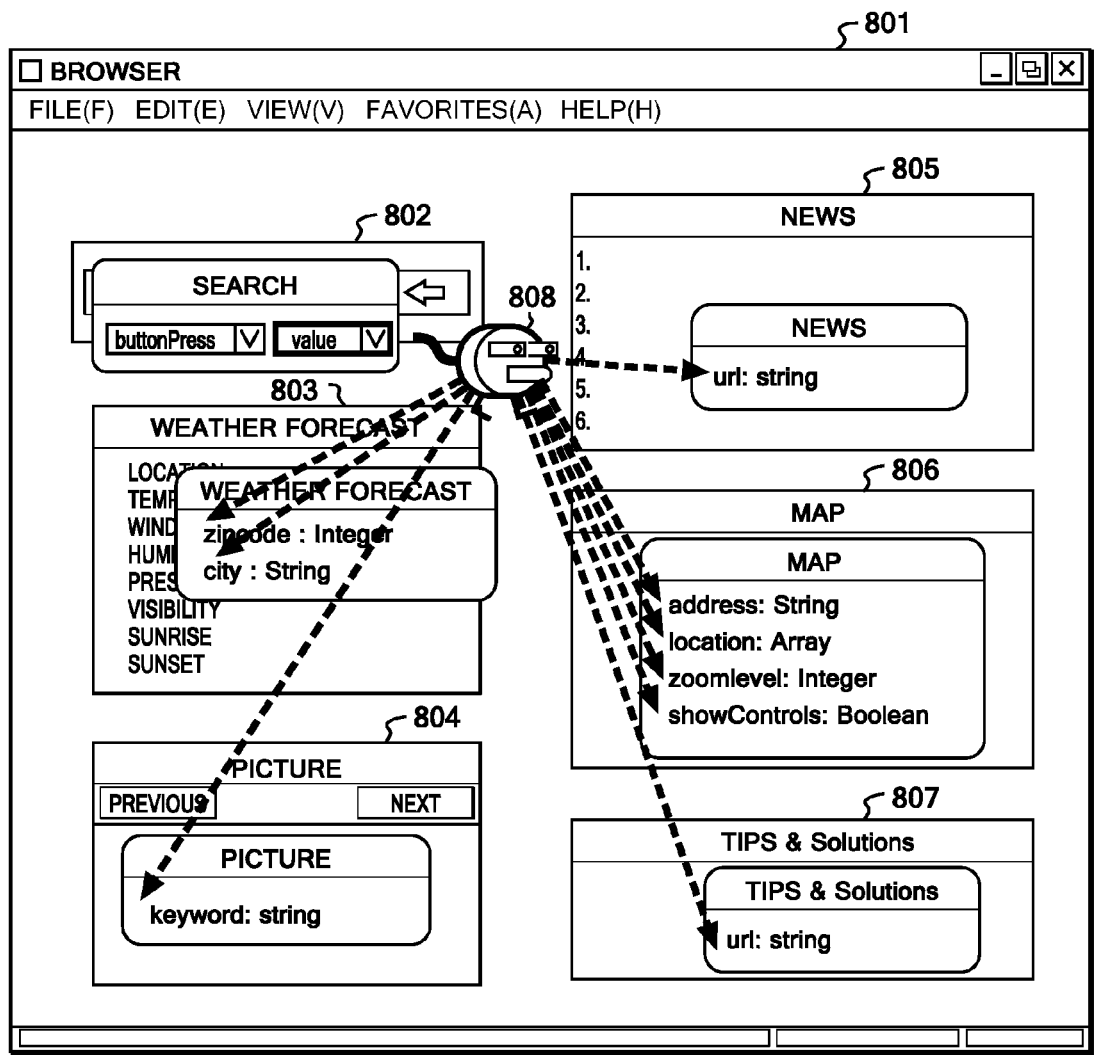
FIG. 8B shows all the properties of all the link-target candidates which seem to be linkable with the source component.

FIG. 8B shows all the properties of all the target components (803 to 807) which seem to be linkable with the source component (802).

When there are many target components or properties, and consequently, when there are many candidates to be linked with the source component (802), it is not easy for the user to find a property of a target component that can be linked with the source component (802).

In FIG. 8B, the dotted arrows are shown to illustrate existence of link-target candidates, and are not displayed in actual applications.

Figure 8C:
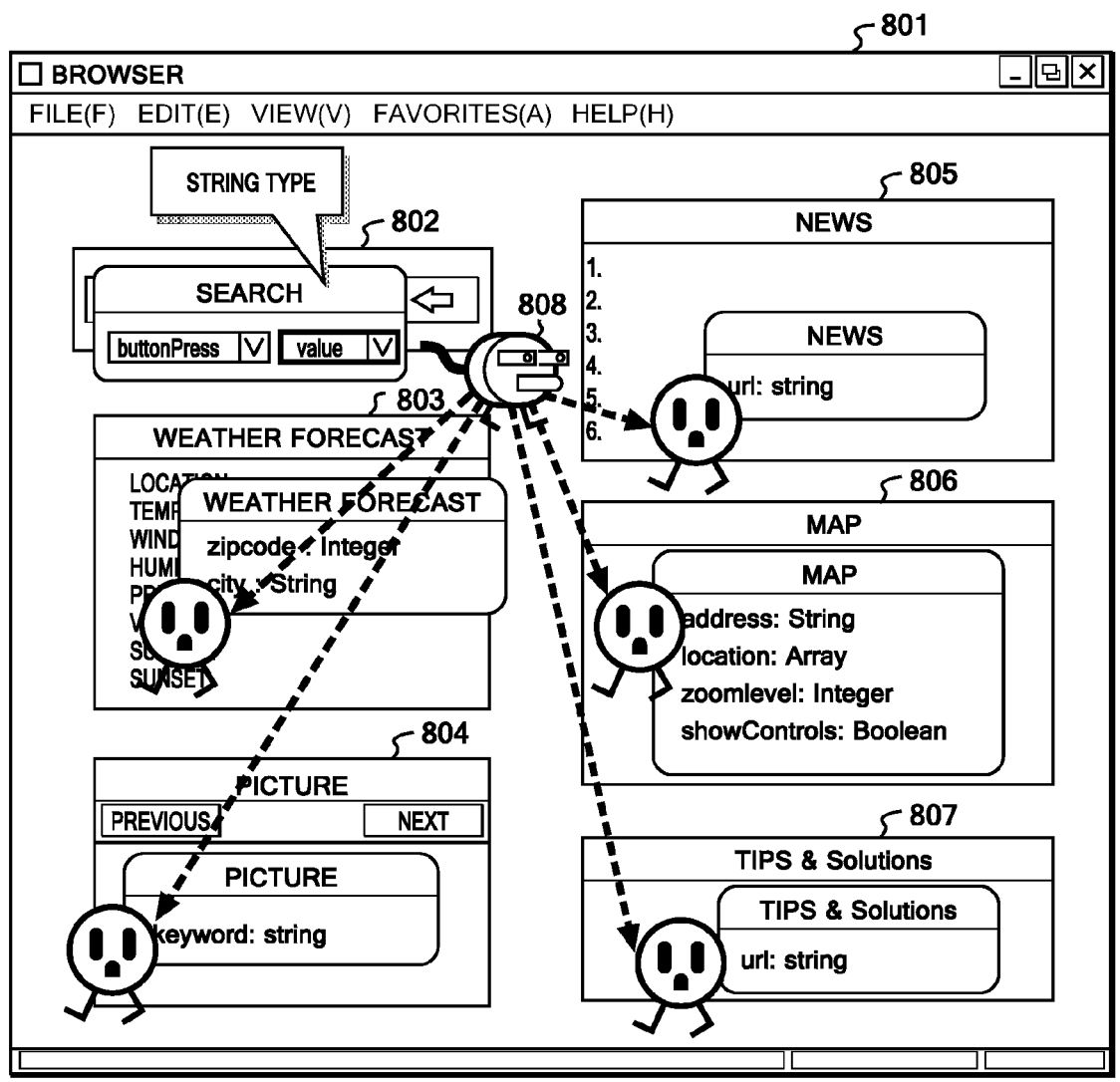
FIG. 8C shows that the candidates to be linked with the source component are somewhat narrowed down, which is the different embodiment of the present invention.

FIG. 8C shows that the candidates to be linked with the source component (802) are somewhat narrowed down in the different embodiment of the present invention.

Attribute information can be used to determine whether an output property of the source component (802) is linkable to an input property of any of the target components (803 to 807). When an input property of any of the target components (803 to 807) includes part or all of the attribute information of an output property of the source component (802), a link-target icon is displayed on or near the input property of the target component. For example, consider a case where the attribute information of an output property of the source component (802) is the string type. In this case, out of the input properties of the target components, input properties of the string type are displayed, or a link-target icon is displayed on or near each of those input properties. The search-box component (802) is a string type. Alternatively, topic names respectively associated with the source component (802) and the target components (803 to 807) may be used.

The link-target icons (socket icons) are displayed only on or near the display of the linkable properties. A link-target icon (809) for each target component has a shape that corresponds to the link-source icon (808) for the source component (802).

Figure 9:
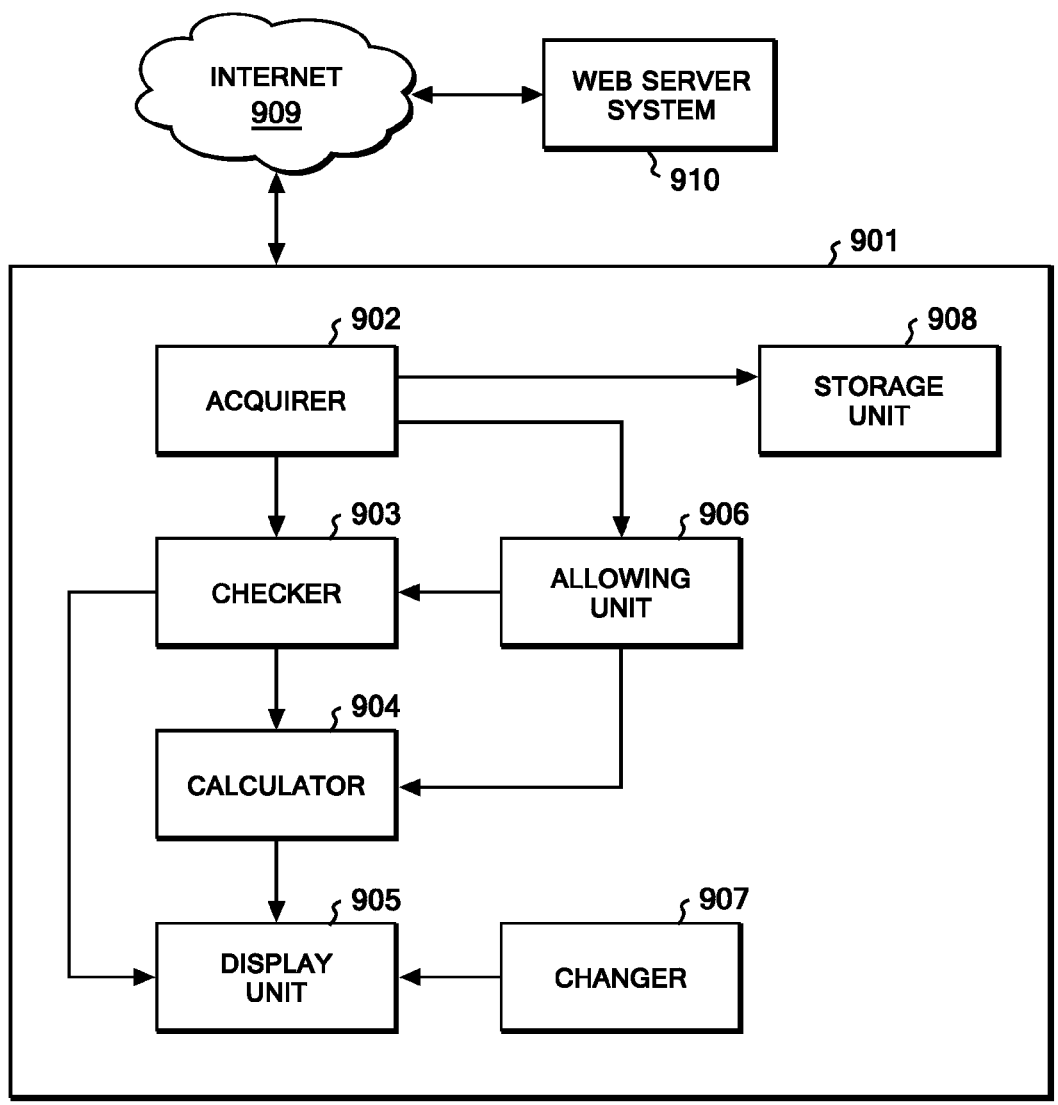
FIG. 9 shows a diagram of a computer system configuration necessary to execute a web application, which is an embodiment of the present invention.

FIG. 9 shows a diagram of a computer system configuration necessary to execute a web application, which is an embodiment of the present invention.

A computer system (901) includes an acquirer (902), a checker (903), a calculator (904), a display unit (905), an allowing unit (906), a changer (907), and a storage unit (908). The computer system (901) is connected to a web server system (910) through an internet (909) or an intranet.

In one embodiment of the present invention, the acquirer (902) acquires tags assigned to the properties of target components, namely, components other than a source component, and then stores them in the storage unit (908). In a different embodiment of the present invention, the acquirer (902) acquires attribute information of the source component (first attribute information) and attribute information of each of the target components (second attribute information), and stores them in the storage unit (908).

In the one embodiment of the present invention, the checker (903) checks a tag, which is selected by the user on the source component from tags (first tags) that are assigned to properties of the target components and collected on the source component, against tags (second tags) assigned to each of the properties of the target components to check if the second tags of the property include the selected first tag. In the different embodiment of the present invention, the checker (903) checks the first attribute information against the second attribute information to determine if the first attribute information matches part or all of the second attribute information.

In the one embodiment of the present invention, the calculator (904) checks the first tag, which is one or more, selected by the user against the second tags and thus calculates a similarity therebetween. In the different embodiment of the present invention, the calculator (904) checks the first attribute information against the second attribute information, and thus calculates the similarity.

The display unit (905) displays the source component and the target components on a display device. On the display device, the display unit (905) further displays a link line between an output field of the source component and an input field of the target component that can be linked with the source component. On the display device, the display unit (905) further displays a link-source icon (first link icon) for the source component and a link-target icon (second link icon) for each target component. On the display device, the display unit (905) further displays the similarity or an indication based on the similarity.

In the one embodiment of the present invention, the allowing unit (906) allows the user to select at least one tag from the first tags.

In accordance with an operation made on the source component, the changer (907) automatically changes the content of the target component having the second link icon which is connected to the first link icon. In addition, in accordance with an operation made on a certain target component, the changer (907) automatically changes the content of the source component having the first link icon which is connected to the second link icon corresponding to the certain target component.

The storage unit (908) stores the components.

Figure 10:
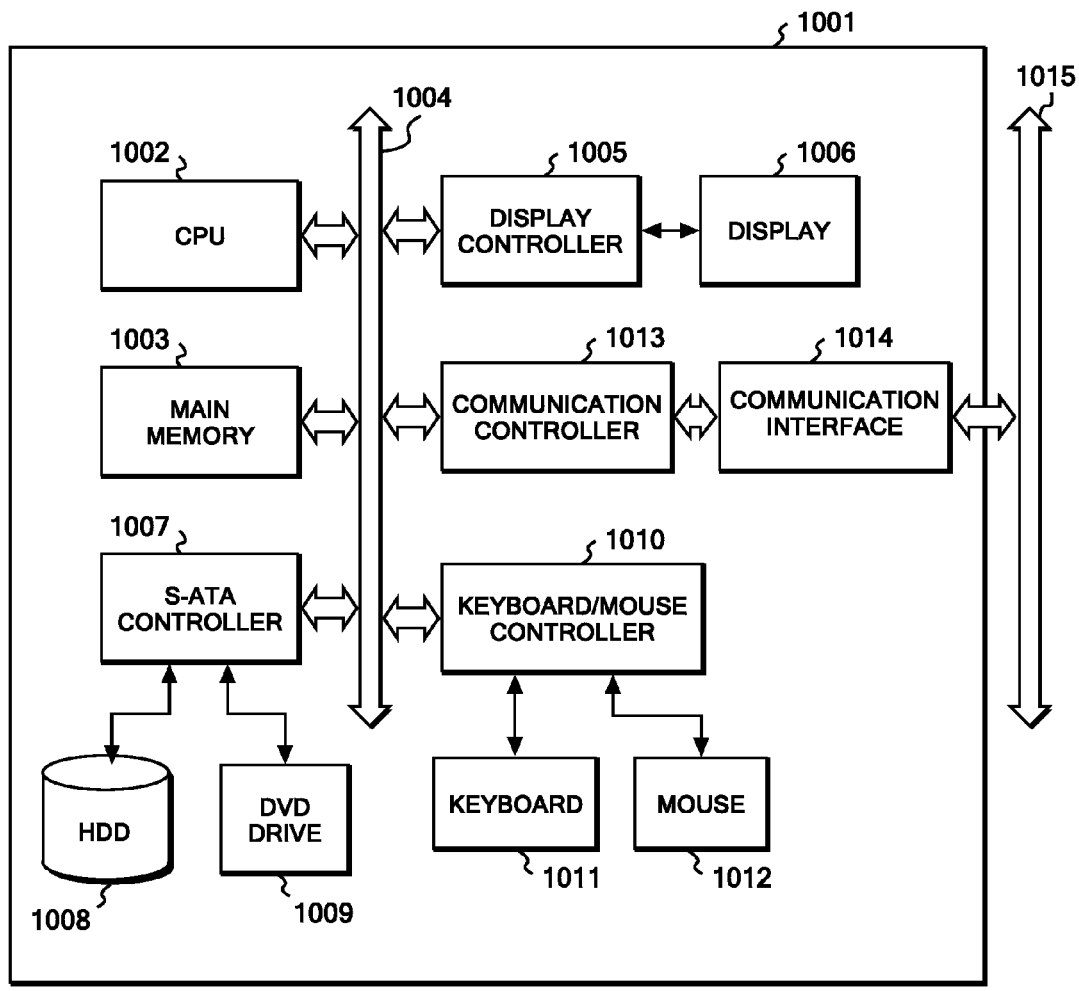
FIG. 10 shows a block diagram of the computer system shown in FIG. 9, in the embodiments of the present invention.

FIG. 10 shows a block diagram of the computer system shown in FIG. 9, in the embodiments of the present invention.

A computer system (1001) includes a CPU (1002) and a main memory (1003) which are connected to each other via a bus (1004). The CPU (1002) is preferably based on a 32-bit or 64-bit architecture, and can employ, for example, Xeon (registered trademark) series, Core (registered trademark) series, Atom (registered trademark) series, Pentium (registered trademark) series, and Celeron (registered trademark) series, of Intel Corporation, Phenom (registered trademark) series, Athlon (registered trademark) series, Turion (registered trademark) series, and Sempron (registered trademark) of Advanced Micro Devices, Inc., or the like. A display (1006), such as an LCD monitor, is connected to the bus (1004) through a display controller (1005). The display (1006) is used to display, with an appropriate graphic interface, information on software running on the computer system (1001). A hard disk or silicon disk (1008) and a CD, DVD, or Blu-ray drive (1009) are further connected to the bus (1004) through an IDE or S-ATA controller (1007). The CD, DVD, or Blu-ray drive (1009) is used, as needed, to introduce a program from a CD-ROM, a DVD-ROM, or a BD to the hard disk or silicon disk (1008). A keyboard (1011) and a mouse (1012) are further connected to the bus (1004) through either a keyboard/mouse controller (1010) or a USB controller (not shown).

A communication interface (1014) is in conformity with, for example, the Ethernet (registered trademark) protocol, and is connected to the bus (1004) through a communication controller (1013). The communication interface (1014) plays a role of physically connecting the computer system (1001) to a communication line (1015), and provides a network interface layer to the TCP/IP communication protocol, being a communication function of the operating system of the computer system (1001). The communication line may be of a LAN environment, or of a wireless LAN environment which is based on wireless LAN connection standards, such as IEEE 802.11a/b/g/n.

The embodiments of the present invention have been described above; however, what are described in those embodiments are examples of the present invention. It is apparent to those skilled in the art that various modifications can be figured out from the embodiments without departing from the technical scope of the present invention.

Although the preferred embodiments of the present invention have been described in detail, it should be understood that various changes, substitutions and alternations can be made therein without departing from spirit and scope of the inventions as defined by the appended claims.

What is claimed is:

1. A method for presenting a candidate to be linked with a component when the component is to be linked to another component in a web application, the method comprising the steps of:
    displaying in a display device of a computer system, at least two components each usable in a web application, the components each having a property assigned with a tag;
    allowing a user through the computer system to select at least one tag from amongst first tags of properties of a first component of the at least two components;
    identifying a second component of the at least two components having a same tag as the selected tag; and
    presenting the identified second component in the display device as a suggestion for linking the second component to the first component.

2. The method according to claim 1, wherein the allowing step further includes the steps of:
    allowing a user to select the first component;
    collecting second tags of properties of the second component; and
    displaying the collected second tags in respect to the first component as the first tags.

3. The method according to claim 1, wherein the allowing step further includes a step of displaying a property, an event, or both for each component, in response to a start of a component-link edit mode.

4. The method according to claim 1, wherein the allowing step further includes a step of displaying the first tags in response to a request by the user to display the first tags.

5. The method according to claim 4, wherein the request to display the first tags is an event selection made by the user.

6. The method according to claim 1, wherein the allowing step further includes a step of displaying a list of the first tags in a list box, on the display device.

7. The method according to claim 6, wherein each of the tags is any of a type name, a property name, a constraint, an annotation, and a template.

8. The method according to claim 1, wherein the identifying step further includes a step of identifying a property of the second component having a same tag as the selected tag.

9. The method according to claim 1, wherein the presenting step further includes a step of presenting the user a property of the second component identified as being assigned a same tag as the first tag.

10. The method according to claim 1, further comprising a step of calculating a similarity value by checking the selected tag against one or more other tags assigned to different ones of the properties of the second component.

11. The method according to claim 10, further comprising a step of displaying any one of the calculated similarity value and an indication based on the calculated similarity value, on each property assigned with the other tags.

12. The method according to claim 1, further comprising a step of displaying, on the display device, a link line between an output of the first component and an input of the second component linkable with the first component.

13. The method according to claim 1, further comprising the steps of:
    displaying a link icon (a first link icon) for the first component on or near the first component; and
    displaying a link icon (a second link icon) for each of the second component on or near the second component when the second component has one or more second tags matching any one, some or all of the selected first tags.

14. The method according to claim 13, wherein
    the step of displaying the second link icon on or near the second component further includes a step of displaying the second link icon on or near a display of a property assigned a second tag matching the selected first tag.

15. The method according to claim 13, further comprising a step of displaying a link line between the first link icon and a certain one of the second link icons linked with the first link icon, in response to an event in which the first link icon is linked to the certain second link icon.

16. The method according to claim 1, further comprising a step of changing input information of the second component linked to an output of the first component, in accordance with an operation made on the first component.

17. The method according to claim 1, further comprising a step of changing output information of the first component linked to an input of the second component, in accordance with an operation made on the second component.

18. The method according to claim 1, wherein
    each of the components is a mashup component.

19. A computer system for presenting a candidate to be linked with a component when the component is to be linked to another component in a web application, the system comprising:
    a computer with at least one processor and memory and configured for communicative coupling to a Web server system over a network;
    a display unit for the computer that displays at least two components, the components each having a property assigned a tag;
    an allowing unit of program code executing in the memory by the processor of the computer that allows a user to select at least one tag from tags assigned to different properties of one component of the at least two components;
    an identification unit of program code executing in the memory by the processor of the computer that identifies a second component having a property having a same tag as the selected first tag; and
    a presenting unit of program code executing in the memory by the processor of the computer that presents the identified second component.

20. A computer program product comprising a computer readable storage medium storing computer usable program code that when loaded into memory of a computer system and executed by a processor of the computer system causes the computer system to execute the steps of:
    displaying, at least two components each usable in a web application, the components each having a property assigned with a tag;

allowing a user through the computer system to select at least one tag from amongst first tags of properties of a first component of the at least two components;
identifying a second component of the at least two components having a same tag as the selected tag; and
presenting the identified second component in the display device as a suggestion for linking the second component to the first component.

\* \* \* \* \*